US012524168B2

United States Patent
Oh et al.

(10) Patent No.: US 12,524,168 B2
(45) Date of Patent: Jan. 13, 2026

(54) NON-VOLATILE MEMORY DEVICE AND STORAGE DEVICE

(71) Applicant: SAMSUNG ELECTRONICS CO., LTD., Suwon-si (KR)

(72) Inventors: Eun Chu Oh, Suwon-si (KR); Beomkyu Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/235,678

(22) Filed: Aug. 18, 2023

(65) Prior Publication Data
US 2024/0184458 A1 Jun. 6, 2024

(30) Foreign Application Priority Data
Dec. 2, 2022 (KR) .......................... 10-2022-0167031

(51) Int. Cl.
*G06F 3/06* (2006.01)

(52) U.S. Cl.
CPC ............ *G06F 3/0625* (2013.01); *G06F 3/064* (2013.01); *G06F 3/0652* (2013.01); *G06F 3/0659* (2013.01); *G06F 3/0679* (2013.01)

(58) Field of Classification Search
CPC ...... G06F 3/0625; G06F 3/064; G06F 3/0652; G06F 3/0659; G06F 3/0679; G06F 13/1668; G06F 3/0658; G11C 16/14; G11C 16/16; G11C 16/0483
See application file for complete search history.

(56) References Cited

U.S. PATENT DOCUMENTS

| 7,640,389 | B2 * | 12/2009 | Eguchi ................ G06F 12/0246 |
| | | | 365/185.29 |
| 8,627,124 | B2 | 1/2014 | Carter et al. |
| 8,694,719 | B2 | 4/2014 | Lassa et al. |
| 9,036,428 | B1 | 5/2015 | D'Abreu |
| 9,418,712 | B1 | 8/2016 | Erez |
| 9,620,217 | B2 | 4/2017 | Lue et al. |
| 9,946,481 | B2 | 4/2018 | Warriner |
| 11,029,859 | B2 | 6/2021 | Margetts et al. |
| 2016/0210083 | A1 * | 7/2016 | Oh ........................ G06F 3/0688 |
| 2019/0065086 | A1 * | 2/2019 | Margetts ............. G06F 13/1668 |
| 2020/0020396 | A1 * | 1/2020 | Kanamori .......... H10N 70/8828 |
| 2022/0129198 | A1 * | 4/2022 | Liu ..................... G06F 13/1673 |

\* cited by examiner

*Primary Examiner* — Hosain T Alam
*Assistant Examiner* — Subir Kumar Chowdhury
(74) *Attorney, Agent, or Firm* — Morgan, Lewis & Bockius LLP

(57) ABSTRACT

A storage device includes at least one non-volatile memory including a plurality of blocks, each block of the plurality of blocks including a plurality of independently erasable sub-blocks. The storage device further includes a storage controller configured to select an erase mode from among a plurality of erase modes according to at least one of an operation schedule and a power consumption of the non-volatile memory, and control an erase operation of the non-volatile memory, according to the selected erase mode. Based on the selected erase mode being a first sub-block erase mode, the storage controller controls an erase operation with respect to one selected sub-block of a selected block. Based on the selected erase mode being a second sub-block erase mode, the storage controller controls an erase operation with respect to two or more selected sub-blocks of the selected block.

20 Claims, 28 Drawing Sheets

NON-VOLATILE MEMORY DEVICE AND STORAGE DEVICE

CROSS-REFERENCE TO RELATED APPLICATIONS

This application claims benefit of priority under 35 U.S.C. § 119 to Korean Patent Application No. 10-2022-0167031, filed on Dec. 2, 2022, in the Korean Intellectual Property Office, the disclosure of which is incorporated by reference herein in its entirety.

BACKGROUND

1. Field

The present disclosure relates generally to a memory device, and more particularly, to a non-volatile memory device including sub-blocks and a storage device including the non-volatile memory device.

2. Description of Related Art

Non-volatile memory devices may need to meet and/or be designed according to various types of power consumption specifications. For example, when a non-volatile memory device is used in a mobile device (e.g., a mobile phone, smart phone, tablet computer, laptop computer, wearable device, Internet of Things (IOT) device, and the like), a peak power may be a limiting factor for the non-volatile memory device. Alternatively or additionally, when a non-volatile memory device is used in a storage device (e.g., a solid state drive (SSD), and the like), a maximum power consumption may be a limiting factor according to a power specification. However, power consumption of related non-volatile memory devices may tend to increase due to an increase in the throughput of a mobile device and/or a storage device. Accordingly, some operations of the related non-volatile memory devices may be disabled in order to satisfy a power constraint, and as a result, performance of the mobile device and/or the storage device may be degraded.

There exists a need for further improvements in non-volatile memory devices, as the need for increased throughput may be constrained by power consumption. Improvements are presented herein. These improvements may also be applicable to other memory devices and/or other semiconductor devices.

SUMMARY

The present disclosure provides a non-volatile memory device and a storage device capable of potentially improving performance and controlling power consumption.

According to an aspect of the present disclosure, a storage device is provided. The storage device includes a non-volatile memory including a plurality of blocks, each block of the plurality of blocks including a plurality of independently erasable sub-blocks. The storage device further includes a storage controller configured to select an erase mode from among a plurality of erase modes including a first sub-block erase mode and a second sub-block erase mode, and control an erase operation of the non-volatile memory, according to the selected erase mode. The storage controller is further configured to select the selected erase mode according to at least one of an operation schedule and a power consumption of the non-volatile memory. Based on the selected erase mode being the first sub-block erase mode, the storage controller is configured to control a first erase operation with respect to one selected sub-block from among the plurality of independently erasable sub-blocks of a selected block from among the plurality of blocks. Based on the selected erase mode being the second sub-block erase mode, the storage controller is configured to control a second erase operation with respect to two or more selected sub-blocks from among the plurality of independently erasable sub-blocks of the selected block.

According to an aspect of the present disclosure, a storage device is provided. The storage device includes a plurality of non-volatile memories, each non-volatile memory of the plurality of non-volatile memories including a plurality of blocks, each block of the plurality of blocks including a plurality of independently erasable sub-blocks. The storage device further includes a storage controller configured to select, for each non-volatile memory of the plurality of non-volatile memories, a corresponding erase mode, according to at least one of an operation schedule and power consumption of the plurality of non-volatile memories, and control, for each non-volatile memory of the plurality of non-volatile memories, an erase operation of that non-volatile memory according to the corresponding erase mode. The storage controller is further configured to select a sub-block erase mode as the corresponding erase mode of at least one non-volatile memory of the plurality of non-volatile memories based on the power consumption being greater than or equal to a threshold value, and control the erase operation with respect to at least one sub-block from among the plurality of independently erasable sub-blocks of the at least one non-volatile memory of the plurality of non-volatile memories based on the sub-block erase mode being the corresponding erase mode of the at least one non-volatile memory.

According to an aspect of the present disclosure, a non-volatile memory device is provided. The non-volatile memory device includes a memory cell array including a plurality of blocks, each block of the plurality of blocks including a plurality of memory stacks stacked above a substrate in a vertical direction. The non-volatile memory device further includes an erase mode selector configured to select an erase mode from among a plurality of erase modes based on a command received from a storage controller, and control an erase operation with respect to the memory cell array according to the selected erase mode. The erase operation is performed on a selected block from among the plurality of blocks based on the selected erase mode being a block erase mode. The erase operation is performed on one of the plurality of memory stacks of the selected block based on the erase mode being a first sub-block erase mode. The erase operation is performed on two or more memory stacks from among the plurality of memory stacks of the selected block based on the erase mode being a second sub-block erase mode.

Additional aspects may be set forth in part in the description which follows and, in part, may be apparent from the description, and/or may be learned by practice of the presented embodiments.

BRIEF DESCRIPTION OF DRAWINGS

The above and other aspects, features, and advantages of certain embodiments of the present disclosure may be more apparent from the following description taken in conjunction with the accompanying drawings, in which.

DETAILED DESCRIPTION

Figure 1:
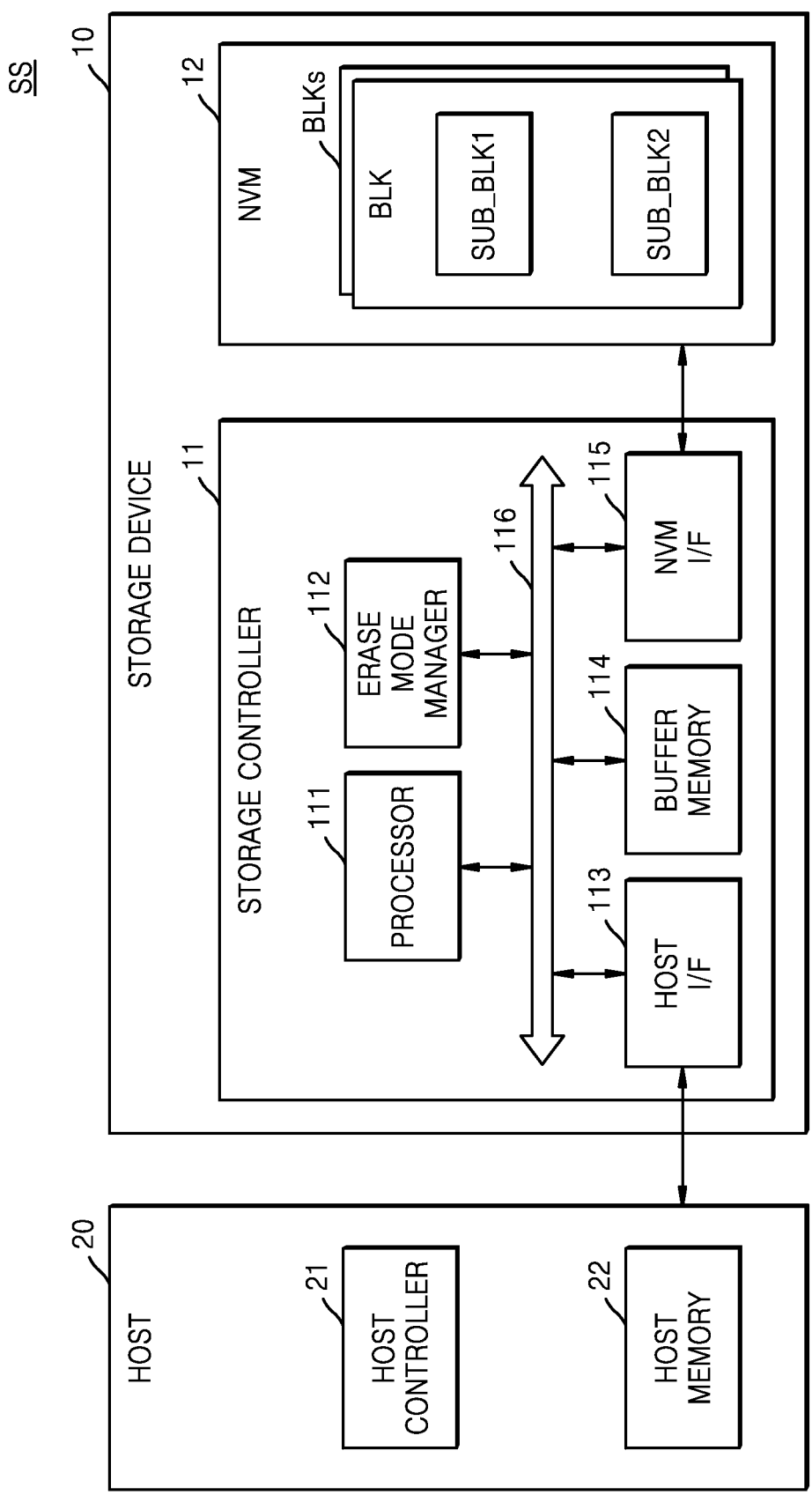
FIG. 1 is a block diagram illustrating a storage system, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", etc. may be replaced with terms, such as "first," "second," third" to be used to describe relative positions of elements. The terms "first," "second," third" may be used to described various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments of the present disclosure are described with reference to the accompanying drawings.

FIG. 1 is a block diagram illustrating a host storage system (SS), according to an embodiment.

Referring to FIG. 1, the host storage system SS may include a storage device 10 and a host 20. The storage device 10 may include a storage controller 11 and a non-volatile memory (NVM) 12. According to some embodiments, the storage controller 11 may be referred to as a memory controller and/or an NVM controller. The NVM 12 may include a plurality of blocks BLKs, and each block BLK may include a plurality of independently erasable sub-blocks (e.g., first sub-block SUB_BLK1, second sub-block SUB_BLK2, hereinafter "SUB_BLK" generally). In an embodiment, a plurality of sub-blocks SUB_BLK may have different block sizes. However, the present disclosure is not limited thereto. For example, in an optional or additional embodiment, the plurality of sub-blocks SUB_BLK may have the same block size. As used herein, a block size may correspond to the number of word lines connected to each sub-block SUB_BLK. For example, the block size may correspond to the length of each sub-block SUB_BLK in a vertical direction (e.g., VD of FIG. 4A).

In an embodiment, an erase operation on the NVM 12 may be performed in block units and/or sub-block units, according to an erase mode. For example, in a block erase mode and/or a full block erase mode, an erase operation may be independently performed on each of the plurality of blocks BLKs of NVM 12. That is, the erase operation may be performed in block units. For another example, in the sub-block erase mode, an erase operation may be independently performed on each of a plurality of sub-blocks of one or more blocks of the plurality of blocks BLKs of NVM 12. That is, the erase operation may be performed in sub-block units. In such an embodiment, a default erase mode may be the sub-block erase mode, but the present disclosure is not limited thereto. For example, the default erase mode may be the block erase mode.

In an optional or additional embodiment, an erase operation on the NVM 12 may be performed in full block units and/or sub-block units, according to an erase mode. For example, in the full block erase mode, a full block erase operation may be performed on all the blocks (e.g., the plurality of blocks BLKs) of the NVM 12. That is, the erase operation may be performed in full block units. For another example, in the sub-block erase mode, an erase operation may be independently performed on each of a plurality of sub-blocks of one or more blocks of the plurality of blocks BLKs of NVM 12. That is, the erase operation may be performed in sub-block units. In such an embodiment, the default erase mode may be the sub-block erase mode, but the present disclosure is not limited thereto. For example, the default erase mode may be the full block erase mode.

In an embodiment, the first and second sub-blocks SUB_BLK1 and SUB_BLK2 may respectively correspond to first and second memory stacks (e.g., ST1 and ST2 of FIG. 6) disposed on a substrate in a vertical direction. Alternatively or additionally, the block size of the plurality of sub-blocks SUB_BLK may correspond to a stack size. For example, the size of the first memory stack may correspond to the length of the first memory stack in a vertical direction, and the size of the second memory stack may correspond to the length of the second memory stack in a vertical direction.

In an optional or additional embodiment, an erase operation on the NVM 12 may be performed in block units and/or in memory stack units, according to an erase mode. For example, in the block erase mode, an erase operation may be independently performed on each of the plurality of blocks BLKs of NVM 12. That is, the erase operation may be performed in block units. For another example, in the full block erase mode, an erase operation may be simultaneously performed on all the blocks (e.g., the plurality of blocks BLKs) of NVM 12. That is, the erase operation may be performed in full block units. For another example, in the sub-block erase mode, an erase operation may be independently performed on each of a plurality of memory stacks. That is, the erase operation may be performed in memory stack units.

In an embodiment, a sub-block erase mode may include a plurality of sub-block erase modes. For example, in a first sub-block erase mode and/or in a stack erase mode, an erase operation may be independently performed on each memory stack included in each block BLK. For another example, in a second sub-block erase mode and/or in a multi-stack erase mode, an erase operation may be independently performed on at least two memory stacks included in each block BLK. For another example, in a third sub-block erase mode and/or in a sub-stack erase mode, an erase operation may be independently performed on each of a plurality of groups included in each memory stack. For another example, in a fourth sub-block erase mode and/or in a cross stack erase mode, an erase operation may be independently performed on a plurality of groups respectively included in a plurality of memory stacks.

The storage controller 11 may be configured to communicate with the NVM 12 and to manage an erase mode with respect to the NVM 12. For example, as shown in FIG. 1, the storage controller 11 may include a set of components, such as a processor 111, an erase mode manager 112, a host interface (I/F) 113, a buffer memory 114, and an NVM interface 115. The set of components of the storage controller 11 may be communicatively coupled with each other via a bus 116.

The bus 116 may include one or more components that may permit communication among the set of components of the storage controller 11. For example, the bus 116 may be a communication bus, a cross-over bar, a network, or the like. In an embodiment, the bus 116 may be implemented using multiple (e.g., two or more) connections between the set of components of storage controller 11. The present disclosure is not limited in this regard.

The erase mode manager 112 may be configured to select at least one erase mode from among a plurality of erase modes, based on at least one of an operation schedule and a power consumption of the NVM 12. Alternatively or additionally, the erase mode manager 112 may control an erase operation on the NVM 12, according to the selected erase mode. In an embodiment, the plurality of erase modes may include, but not be limited to, at least two of a block erase mode, a full block erase mode, and a sub-block erase mode. For example, the sub-block erase mode may include a stack erase mode and a multi-stack erase mode. For another example, the sub-block erase mode may further include a sub-stack erase mode and a cross-stack erase mode.

In an embodiment, when an intensive read operation and/or program (e.g., write) operation is indicated as having been performed by the NVM 12 on the operation schedule of the NVM 12, the erase mode manager 112 may select a sub-block erase mode from among a plurality of erase modes based on checking the operation schedule of the NVM 12. Alternatively or additionally, when an intensive read operation and/or a program operation has not been performed on the NVM 12, the erase mode manager 112 may select a block erase mode and/or a full block erase mode from among a plurality of erase modes, based on checking the operation schedule of the NVM 12.

In another optional or additional embodiment, based on checking the power consumption of the NVM 12 and/or the storage device 10, the erase mode manager 112 may select a sub-block erase mode from among a plurality of erase modes when the power consumption is greater than or equal to a threshold value. Alternatively or additionally, the erase mode manager 112 may select a block erase mode from among a plurality of erase modes, when the power consumption is less than the threshold value.

In an embodiment, in a low power mode in which power consumption is greater than or equal to a threshold value, the erase mode manager 112 may select a sub-block erase mode, and accordingly, may control an erase operation on at least one sub-block of a plurality of sub-blocks SUB_BLK of a block BLK selected from the plurality of blocks BLKs included in the NVM 12. In an optional or additional embodiment, in a normal power mode in which the power consumption is less than the threshold value, the erase mode manager 112 may select a block erase mode, and accordingly, may control an erase operation on a block BLK selected from the plurality of blocks BLKs included in the NVM 12. In an another optional or additional embodiment, in the normal power mode in which the power consumption is less than the threshold value, the erase mode manager 112 may select a full block erase mode, and accordingly, may control an erase operation on the plurality of full blocks BLKs included in the NVM 12.

In an embodiment, the erase mode manager 112 may perform an erase mode selection operation when a request for an erase operation occurs. For example, the erase mode manager 112 may select one of a plurality of erase modes before performing a program operation, and the storage controller 11 may transfer the selected erase mode to the NVM 12. For another example, the erase mode manager 112 may select one of a plurality of erase modes to secure a free block, and the storage controller 11 may transfer the selected erase mode to the NVM 12. That is, when performing an erase operation on the NVM 12 according to a sub-block erase mode and a free space corresponding to a block unit is required, the erase mode manager 112 may perform a sub-block erase operation on a plurality of blocks and/or a plurality of non-volatile memories.

In an embodiment, the erase mode manager 112 may perform an erase mode selection operation further based on an erase time, a latency, and/or a throughput. For example, the erase mode manager 112 may select a sub-block erase mode when an erase-program interval (EPI) with respect to a specific block exceeds a reference time so that EPIs with respect to the plurality of memory blocks BLKs may be maintained within a certain time. Alternatively or additionally, the storage controller 11 may transfer the selected sub-block erase mode to the NVM 12. For example, the erase mode manager 112 may select a sub-block erase mode when the number of program commands exceeds a reference number in order to satisfy latency with respect to a program operation, and may transfer the selected sub-block erase mode to the NVM 12. For another example, the erase mode manager 112 may select a sub-block erase mode when throughput exceeds a reference value, and may transfer the selected sub-block erase mode to the NVM 12.

According to an embodiment, the erase mode manager 112 may be implemented in software, firmware, hardware, and/or a combination thereof. In an embodiment, the erase mode manager 112 may be implemented in software, the storage controller 11 may further include a working memory into which the erase mode manager 112 is loaded, and the processor 111 may control an erase mode selection operation on the NVM 12 by executing the erase mode manager 112. For example, the working memory may be implemented as volatile memory, such as, but not limited to, static random access memory (SRAM) or dynamic RAM (DRAM), and/or NVM, such as, but not limited to, flash memory or phase change RAM (PRAM).

In an embodiment, the erase mode manager 112 may be implemented in a Flash Translation Layer (FTL), and the processor 111 may control an erase mode selection operation on the NVM 12 by executing the FTL. In such an embodiment, the processor 111 may control data writing and/or reading operations on the NVM 12 by executing the FTL. Alternatively or additionally, the FTL may perform various functions, such as wear-leveling and garbage collection. Wear-leveling may refer to a technique of preventing excessive deterioration of a specific block by uniformly using blocks in the NVM 12, and may be implemented through a firmware technique that may balance erase counts of physical blocks. Garbage collection may refer to a technique of selecting a victim sub-block from among a plurality of sub-blocks of the NVM 12 and copying valid data in the victim sub-block to a new sub-block (e.g., a target sub-block) and then erasing the victim sub-block, in order to secure usable capacity in the NVM 12.

The processor 111 may include a central processing unit (CPU) and/or a microprocessor, and may control all operations of the storage controller 11. In an embodiment, the processor 111 may be implemented as a multi-core processor (e.g., a dual-core processor or quad-core processor). The buffer memory 114 may temporarily store data to be written to the NVM 12 and/or data read from the NVM 12. The buffer memory 114 may be included in the storage controller 11, but may be disposed outside the storage controller 11. For example, the storage controller 11 may further include a buffer memory manager and/or a buffer memory interface for communicating with the buffer memory 114.

The host interface 113 may transmit/receive packets to/from the host 20. A packet transmitted from the host 20 to the host interface 113 may include a command and/or data to be written in the NVM 12. A packet transmitted from the host interface 113 to the host 20 may include a response to a command and/or data read from the NVM 12. The NVM interface 115 may transmit data to be written in the NVM 12 to the NVM 12 and/or receive data read from the NVM 12. The NVM interface 115 may be implemented to comply with one or more memory storage standard protocols, such as Toggle and Open NAND Flash Interface (ONFI).

The storage device 10 may include storage media storing data according to a request from the host 20. For example, the storage device 10 may include at least one of a solid state drive (SSD), an embedded memory, and a removable external memory. When the storage device 10 is and/or includes an SSD, the storage device 10 may be and/or include a device conforming to one or more non-volatile memory express (NVMe) standards (e.g., NVMe, Peripheral Component Interconnect (PCI), PCI Express (PCIe), NVMe over Fabrics, and the like). When the storage device 10 is and/or includes an embedded memory and/or an external memory, the storage device 10 may be and/or include a device conforming to an universal flash storage (UFS) and/or an embedded multi-media card (eMMC) standard. The host 20 and the storage device 10 may each generate and/or transmit a packet according to one or more adopted standard protocols.

In an embodiment, the host 20 may include a host controller 21 and a host memory 22. The host controller 21 may manage an operation of storing data of a buffer area of the host memory 22 in the NVM 12 and/or storing data of the NVM 12 in the buffer area. For example, the host memory 22 may function as a buffer memory temporarily storing data to be transmitted to the storage device 10 and/or data transmitted from the storage device 10. In an embodiment, the host controller 21 may be any one of a plurality of modules included in an application processor, and the application processor may be implemented as a System on Chip (SoC). Alternatively or additionally, the host memory 22 may be and/or include an embedded memory included in the application processor, and/or may be an NVM and/or a memory module disposed outside the application processor.

The number and arrangement of components of the host storage system SS shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other and implemented as an integrated circuit, as software, and/or as a combination of circuits and software.

Figure 2:
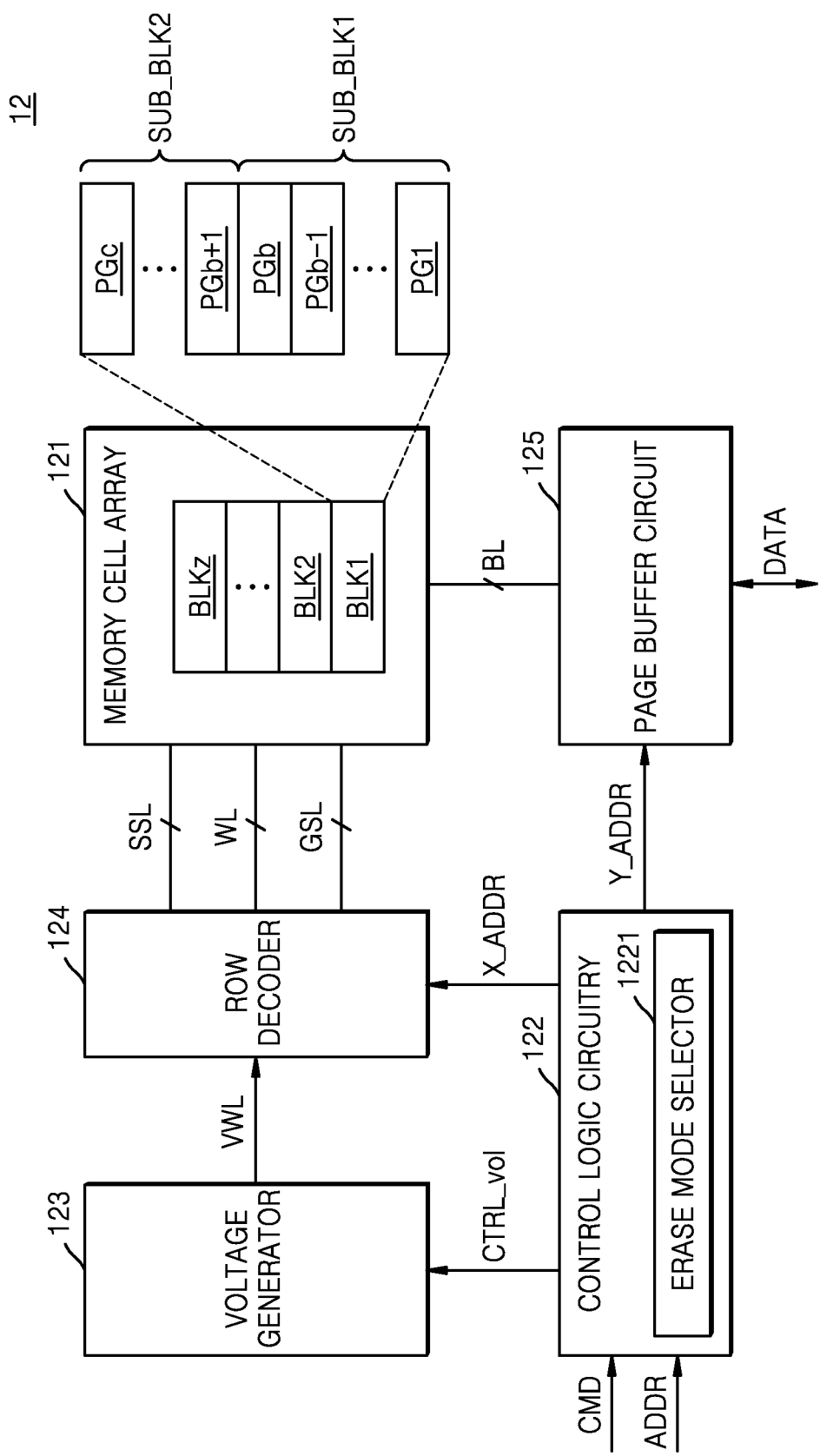
FIG. 2 is a block diagram illustrating a non-volatile memory, according to an embodiment.

FIG. 2 is a block diagram illustrating the NVM 12 according to an embodiment. Referring to FIG. 2, the NVM 12 may include a memory cell array 121, control logic circuitry 122, a voltage generator 123, a row decoder 124, and a page buffer circuit 125. The NVM 12 may correspond to an implementation example of the NVM 12 of FIG. 1. That is, the NVM 12 of FIG. 2 may include or may be similar in many respects to the NVM 12 described above with reference to FIG. 1. However, the NVM 12 of FIG. 2 may include additional features not mentioned above.

The memory cell array 121 may include a plurality of memory blocks (e.g., BLK1 to BLKz, hereinafter "BLK" generally). Each block of the plurality of memory blocks BLK may include a plurality of pages (e.g., PG1 to PGc, hereinafter "PG" generally), where z and c may be positive integers greater than zero and may be variously changed according to some embodiments. For example, some pages PG1 to PGb among the plurality of pages PG1 to PGc may be included in the first sub-block SUB_BLK1, and the remaining pages PGb+1 to PGc among the plurality of pages PG1 to PGc may be included in the second sub-block SUB_BLK2, wherein b may be a positive integer less than c. For example, a memory block and/or a sub-block may be a unit of erase, and/or a page may be a unit of program and read. As shown in FIG. 2, the memory cell array 121 may be connected to the page buffer circuit 125 through bit lines BL, and/or may be connected to the row decoder 124 through word lines WL, string selection lines SSL, and ground selection lines GSL.

In an embodiment, the memory cell array 121 may be and/or may include a three-dimensional (3D) memory cell array. The 3D memory cell array may be and/or include a plurality of NAND strings. Each NAND string may include memory cells which may be respectively connected to word lines WL vertically stacked on a substrate. U.S. Pat. Nos. 7,679,133, 8,553,466, 8,654,587, 8,559,235, and 9,536,970 disclose semiconductor memory devices, the disclosures of which are incorporated by reference herein in their entireties.

In an optional or additional embodiment, the memory cell array 121 may be and/or include a flash memory, and the flash memory may include a two-dimensional (2D) NAND memory array and/or a 3D (vertical) NAND (VNAND) memory array. Alternatively or additionally, the storage device 10 may include other types of NVMs. For example, the memory cell array 121 may include magnetic RAM (MRAM), spin-transfer torque MRAM, conductive bridging RAM (CBRAM), ferroelectric RAM (FeRAM), PRAM, resistive RAM, and the like.

The control logic circuitry 122 may generally control various operations within the NVM 12. That is, the control logic circuitry 122 may output various control signals in response to a command CMD and/or an address ADDR. For example, the control logic circuitry 122 may output a voltage control signal CTRL_vol, a row address X_ADDR, and a column address Y_ADDR. In an embodiment, the control logic circuitry 122 may include an erase mode selector 1221. The erase mode selector 1221 may select an erase mode with respect to the memory cell array 121 based on the command CMD received from the storage controller 11. For example, the command CMD may correspond to an erase command, and the erase command may include information about an erase mode. For another example, the command CMD may correspond to a dedicated command instructing an erase mode, that is, an erase mode command. However, the present disclosure is not limited thereto. In some embodiments, the erase mode selector 1221 may be disposed outside the control logic circuitry 122. For example, the erase mode selector 1221 may be included in a command decoder. For another example, the erase mode selector 1221 may be disposed between the command decoder and the control logic circuitry 122.

The voltage generator 123 may generate various types of voltages for performing program, read, and/or erase operations based on the voltage control signal CTRL_vol. For example, the voltage generator 123 may generate a program voltage, a read voltage, a program verify voltage, an erase voltage, and the like, as a word line voltage VWL.

The row decoder 124 may select one of a plurality of word lines WL and/or one of a plurality of string selection lines SSL in response to the row address X_ADDR. For example, during a program operation, the row decoder 124 may apply a program voltage and a program verify voltage to the selected word line WL. For another example, during a read operation, the row decoder 124 may apply a read voltage to the selected word line WL.

The page buffer circuit 125 may select at least one bit line from among the bit lines BL in response to the column address Y_ADDR. The page buffer circuit 125 may operate as a write driver and/or a sense amplifier according to an operation mode.

Figure 3:
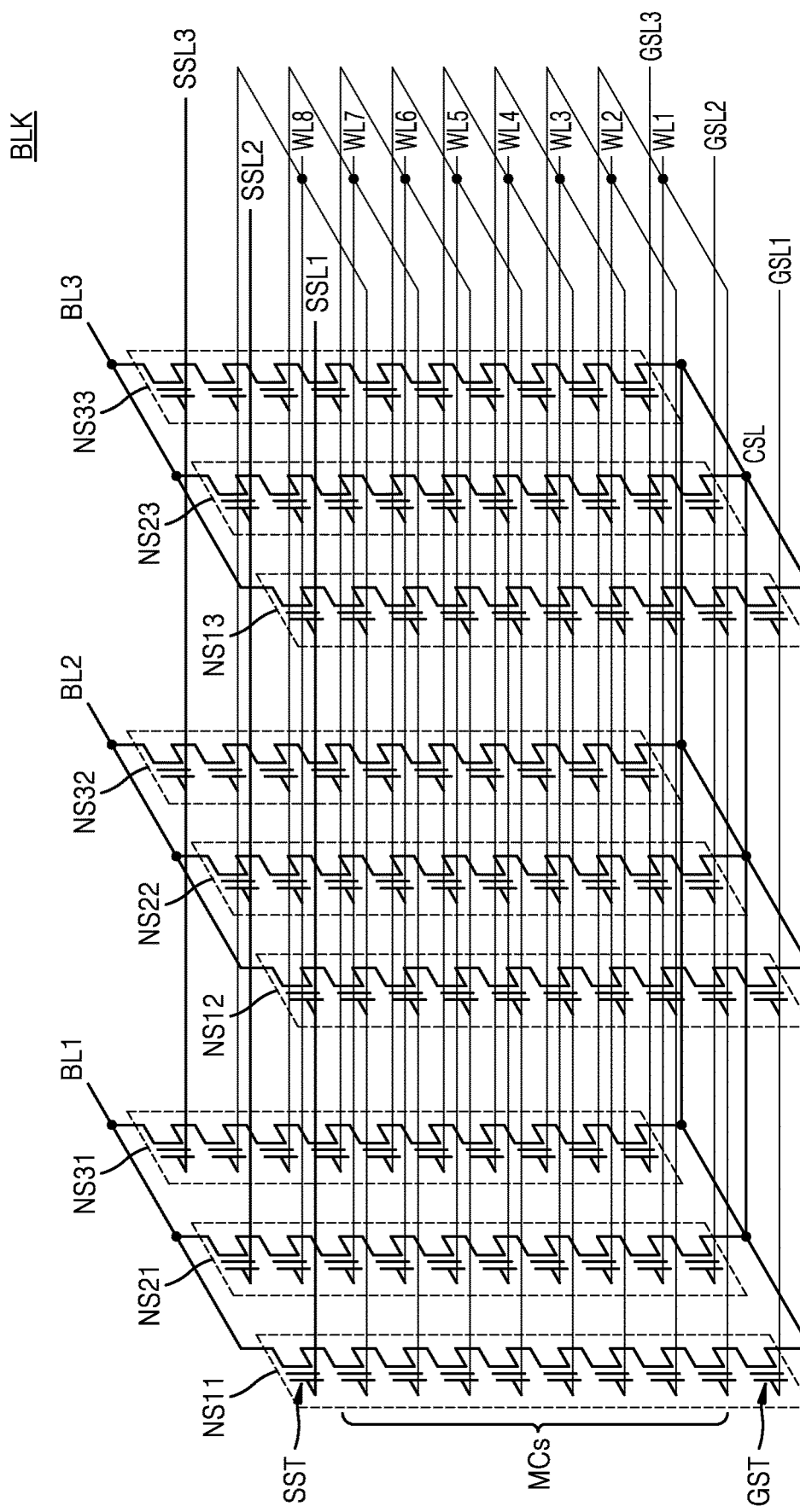
FIG. 3 is a circuit diagram illustrating a memory block, according to an embodiment.

FIG. 3 is a circuit diagram illustrating a memory block BLK, according to an embodiment.

Referring to FIG. 3, the memory block BLK may include or may be similar in many respects to one of the plurality of memory blocks BLK described above with reference to FIG. 2, and may include additional features not mentioned above. The memory block BLK may include NAND strings NS11 to NS33. Each NAND string (e.g., NS11) may include a string selection transistor SST, a plurality of memory cells MCs, and a ground selection transistor GST, which may be connected to each other in series. The transistors SST and GST and the memory cells MCs may be included in each NAND string and may form a stacked structure in a vertical direction on a substrate.

In an embodiment, bit lines (e.g., first bit line BL1, second bit line BL2, and third bit line BL3, hereinafter "BL" generally) may extend in a first direction. Alternatively or additionally, word lines (e.g., first word line WL1, second word line WL2, third word line WL3, fourth word line WL4, fifth word line WL5, sixth word line WL6, seventh word line WL7, and eighth word line WL8) may extend in a second direction. In an embodiment, the NAND strings NS11, NS21, and NS31 may be positioned between the first bit line BL1 and the common source line CSL, the NAND strings NS12, NS22, and NS32 may be positioned between the second bit line BL2 and the common source line CSL, and the NAND strings NS13, NS23, and NS33 may be positioned between the third bit line BL3 and the common source line CSL.

The string selection transistor SST may be connected to a corresponding string selection line (e.g., first string selection line SSL1, second string selection line SSL2, and third string selection line SSL3). The memory cells MCs may be respectively connected to the word lines (e.g., WL1 to WL8). The ground selection transistor GST may be connected to a corresponding ground selection line (e.g., first ground selection line GSL1, second ground selection line GSL2, and third ground selection line GSL3). The string selection transistor SST may be connected to a corresponding bit line BL, and the ground selection transistor GST may be connected to the common source line CSL. In such embodiments, the number of NAND strings, the number of word lines, the number of bit lines, the number of ground selection lines, and the number of string selection lines may be variously changed according to some embodiments and/or design constraints.

Figure 4A:
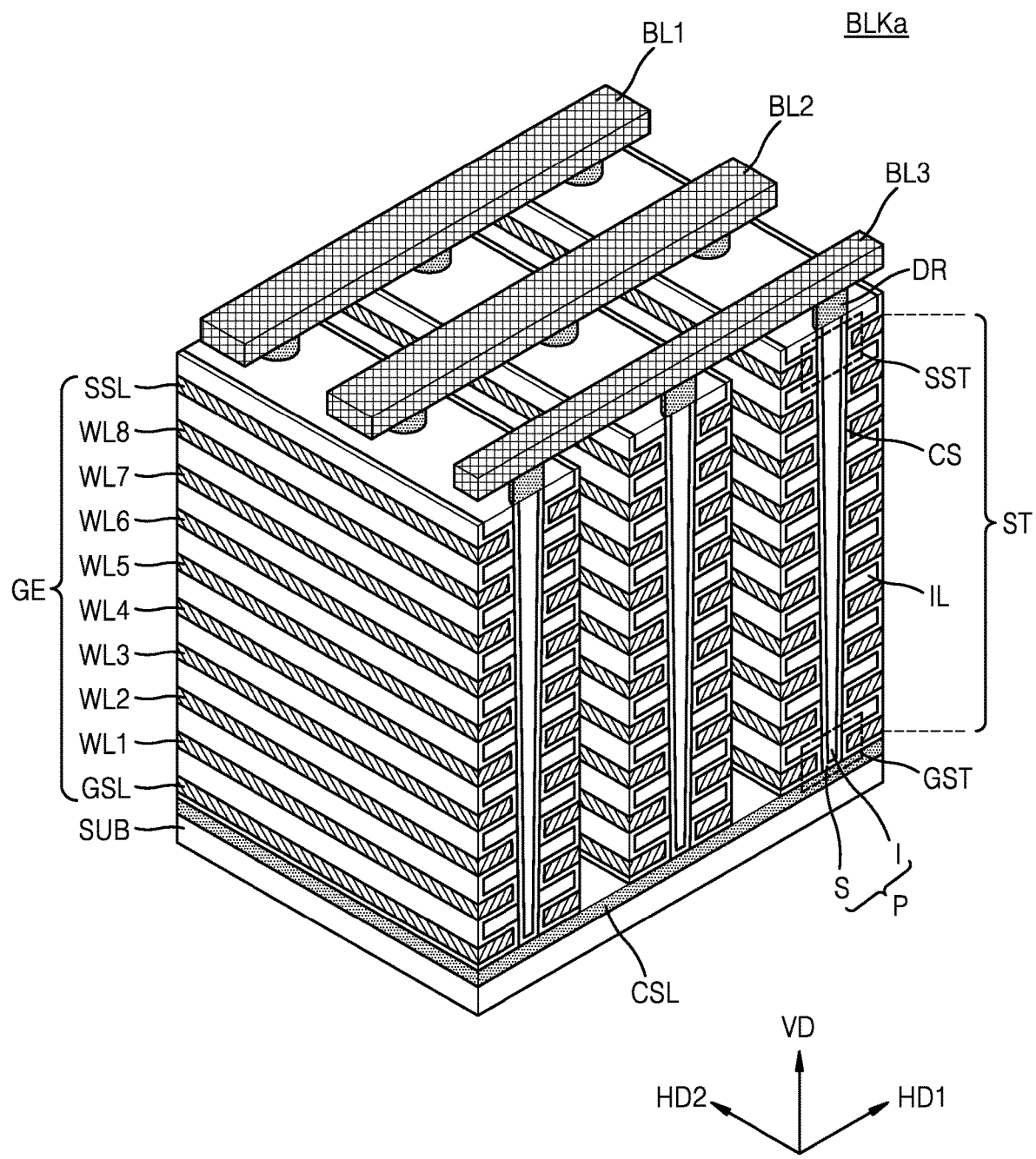
FIGS. 4A and 4B are perspective views each illustrating a memory block, according to some embodiments.

FIG. 4A is a perspective view illustrating a memory block BLKa, according to an embodiment.

Referring to FIG. 4A, the memory block BLKa may correspond to one of the plurality of memory blocks BLK of FIG. 2. The memory block BLKa may include a memory stack ST extending in a vertical direction VD on the upper portion of a substrate SUB. For example, the memory block BLKa may include the single memory stack ST between the substrate SUB and the bit lines BL1 to BL3. Common source lines CSL may be disposed on the substrate SUB, and insulating layers IL extending long in a second horizontal direction HD2 on a region of the substrate SUB between two adjacent common source lines CSL may be sequentially provided in the vertical direction VD, and spaced apart by a specific distance in the vertical direction VD. Pillars P penetrating the insulating layers IL in the vertical direction VD may be provided on a region of the substrate SUB between two adjacent common source lines CSL. A surface layer S of each pillar P may include a first type silicon material and may function as a channel region. In an embodiment, an inner layer I of each pillar P may include an insulating material, such as silicon oxide or an air gap.

In a region between two adjacent common source lines CSL, a charge storage layer CS may be provided along the insulating layers IL, the pillars P, and the exposed surface of the substrate SUB. The charge storage layer CS may include a gate insulating layer, a charge trap layer, and a blocking insulating layer. For example, the charge storage layer CS may have an oxide-nitride-oxide (ONO) structure. Alternatively or additionally, in a region between two adjacent common source lines CSL, a gate electrode GE such as the selection lines GSL and SSL and the word lines WL1 to WL8 may be provided on the exposed surface of the charge storage layer CS. Drains DR may be respectively provided on the plurality of pillars P. The bit lines BL1 to BL3 elongating in the first horizontal direction HD1 and spaced apart from each other by a specific distance in the second horizontal direction HD2 may be provided on the drains DR.

Figure 4B:
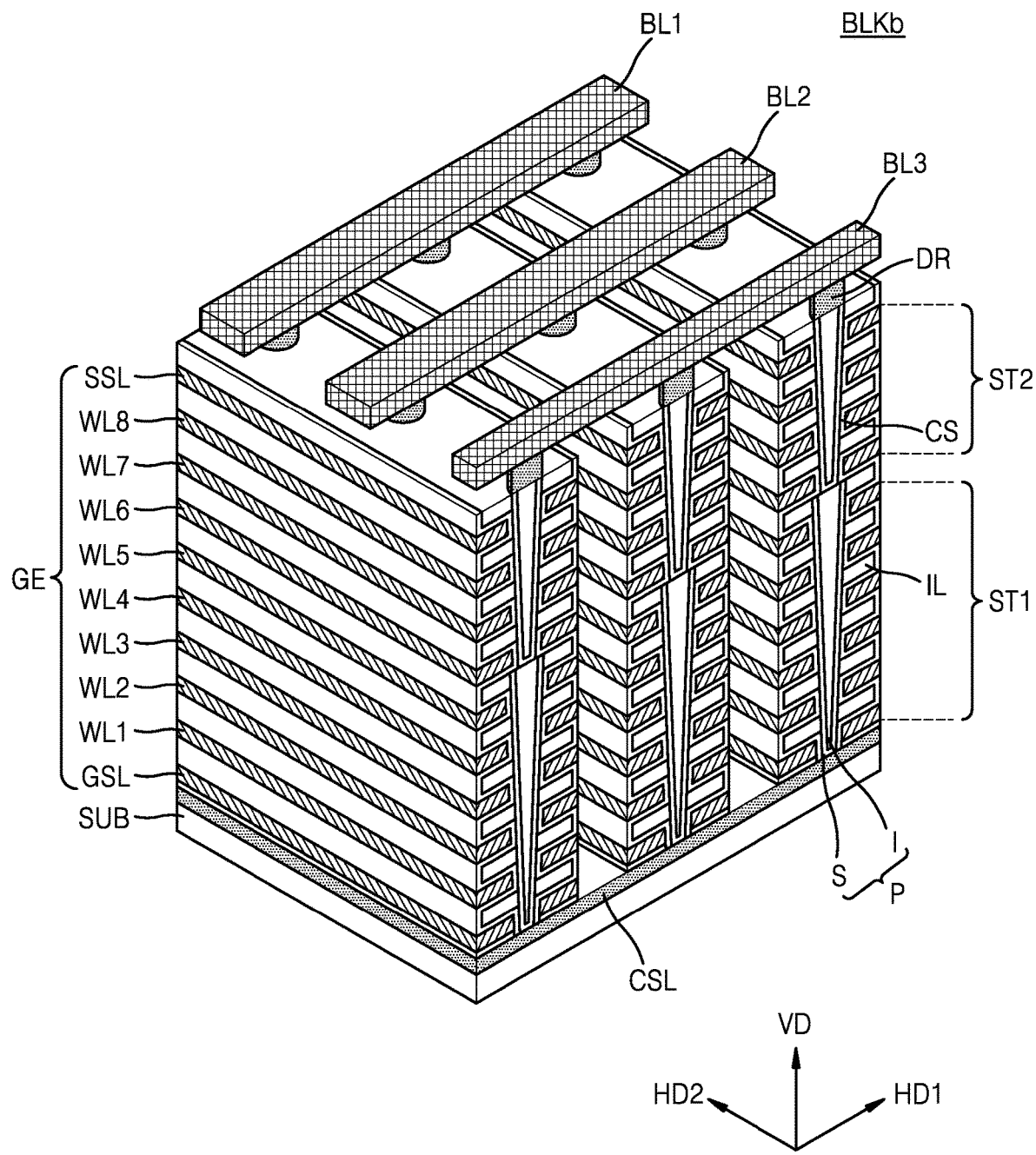

FIG. 4B is a perspective view illustrating a memory block BLKb, according to an embodiment.

Referring to FIG. 4B, the memory block BLKb may include or may be similar in many respects to at least one of the plurality of memory blocks BLK of FIG. 2 and the memory block BLKa of FIG. 4A, and may include additional features not mentioned above. As such, descriptions given above with reference to FIGS. 2 and 4A may also be applied to the memory block BLKb.

In an embodiment, the memory block BLKb may include a first memory stack ST1 and a second memory stack ST2 stacked on the substrate SUB in the vertical direction VD. For example, the memory block BLKb may include two memory stacks (e.g., first and second memory stacks ST1 and ST2) between the substrate SUB and the bit lines BL1 to BL3. That is, the memory block BLKb may have a multi-stack structure (e.g., a 2-stack structure). In an embodiment, the vertical lengths of the first and second memory stacks ST1 and ST2 may be different from each other. However, the present disclosure is not limited thereto. For example, according to some embodiments, the memory block BLKb may include three or more memory stacks between the substrate SUB and the bit lines BL1 to BL3.

Figure 5:
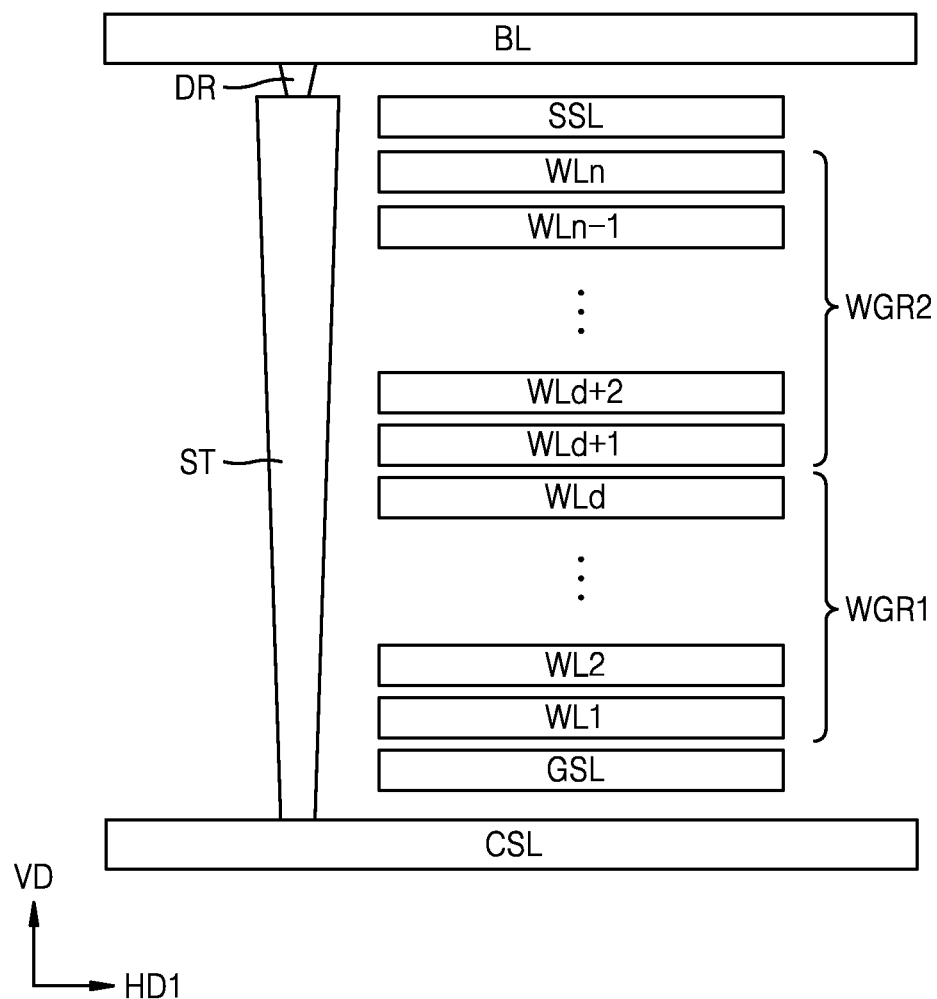
FIGS. 5 to 7 each schematically illustrate a non-volatile memory, according to some embodiments.

FIG. 5 schematically illustrates an NVM 50, according to an embodiment. The NVM 50 may include or may be similar in many respects to the NVM 12 described above with reference to FIGS. 1 and 2, and may include additional features not mentioned above.

Referring to FIG. 5, the NVM 50 may include the common source line CSL and the bit line BL extending in the first horizontal direction HD1 and the memory stack ST extending in the vertical direction VD. That is, the memory stack ST may be connected to the bit line BL through the drain DR. For example, the NVM 50 may correspond to an example of FIG. 4A in which the memory stack ST may correspond to the pillar P of FIG. 4A, and the first cell string NS11 of FIG. 3.

In an embodiment, the NVM 50 may further include a plurality of word lines (e.g., WL1 to WLn, where n is a positive integer greater than zero) stacked in the vertical direction VD. Alternatively or additionally, at least one ground selection line GSL may be provided between the common source line CSL and the word line WL1, and at least one string selection line SSL may be disposed between the bit line BL and the word line WLn. In an optional or additional embodiment, an erase control line (e.g., GIDL_SS) may be further disposed between the string selection line SSL and the bit line BL, and an erase control line (e.g., GIDL_GS) may be further disposed between the ground selection line GSL and the common source line CSL.

In an embodiment, the plurality of word lines WL1 to WLn may be grouped into a plurality of groups including a first word line group WGR1 and a second word line group WGR2. The first word line group WGR1 may include word lines WL1 to WLd relatively close to a substrate, and the second word line group WGR2 may include word lines WLd+1 to WLn relatively far from the substrate. Here, d is a positive integer between 1 and n. For example, according to an embodiment, the plurality of word lines WL1 to WLn may be grouped into three or more groups. In an optional or additional embodiment, the number of word lines included in the first word line group WGR1 and the number of word lines included in the second word line group WGR2 may be different from each other. For example, the number of word lines included in the first word line group WGR1 may be greater than the number of word lines included in the second word line group WGR2. That is, d may be greater than n/2.

Referring to FIGS. 1 and 5 together, the word lines WL1 to WLd included in the first word line group WGR1 may be connected to the first sub-block SUB_BLK1, and the word lines WLd+1 to WLn included in the second word line group WGR2 may be connected to the second sub-block SUB- _BLK2. The storage controller 11 may select one of a plurality of erase modes according to at least one of an operation schedule and a power consumption of the NVM 12. In the block erase mode, the storage controller 11 may perform an erase operation on the block BLK including the first and second sub-blocks SUB_BLK1 and SUB_BLK2. In the sub-block erase mode, the storage controller 11 may perform an erase operation on the first sub-block SUB_BLK1 and/or on the second sub-block SUB_BLK2. Power consumption resulting from the erase operation according to the sub-block erase mode may be lower than power consumption resulting from the erase operation according to the block erase mode. Accordingly, in the low power mode, the storage controller 11 may adjust power consumption by controlling the sub-block erase operation and simultaneously prevent performance degradation of the storage device 10.

Figure 6:
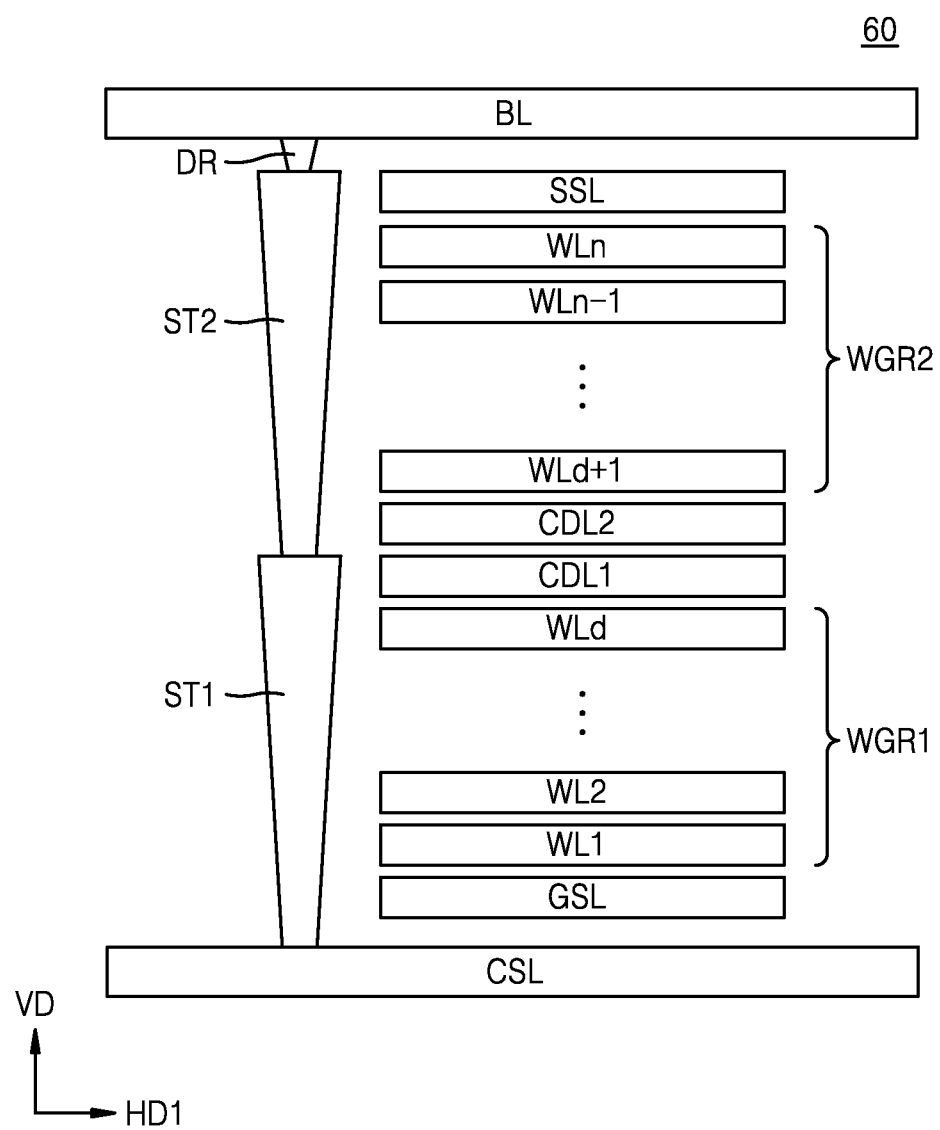

FIG. 6 schematically illustrates an NVM 60 according to an embodiment. The NVM 60 may include or may be similar in many respects to a modified example of the NVM 50 of FIG. 5, and may include additional features not mentioned above. Consequently, a redundant description thereof may be omitted.

Referring to FIG. 6, the NVM 60 may include the common source line CSL and the bit line BL extending in the first horizontal direction HD1 and the first memory stack ST1 and the second memory stack ST2 extending in the vertical direction VD. That is, the first memory stack ST1 may be disposed on the upper portion of the common source line CSL, and the second memory stack ST2 may be disposed on the upper portion of the first memory stack ST1 and connected to the bit line BL through the drain DR. For example, the NVM 60 may correspond to an example of FIG. 4B, and the first memory stack ST1 and the second memory stack ST2 may respectively correspond to the first memory stack ST1 and the second memory stack ST2 of FIG. 4B.

Alternatively or additionally, the NVM 60 may include a first center dummy word line CDL1 and a second center dummy word line CDL2 corresponding to a junction portion of the first and second memory stacks ST1 and ST2. However, the present disclosure is not limited thereto. For example, the number of center dummy word lines corresponding to the junction portion may be variously changed according to some embodiments. According to some optional or additional embodiments, a center dummy word line may not be disposed. In an embodiment, the first memory stack ST1 may be connected to the first word line group WGR1, and the second memory stack ST2 may be connected to the second word line group WGR2.

Referring to FIGS. 1 and 6 together, the word lines WL1 to WLd included in the first word line group WGR1 may be connected to the first sub-block SUB_BLK1, and the word lines WLd+1 to WLn included in the second word line group WGR2 may be connected to the second sub-block SUB_BLK2. The storage controller 11 may select one of a plurality of erase modes according to at least one of an operation schedule or power consumption of the NVM 60. In the block erase mode, the storage controller 11 may perform an erase operation on the block BLK including the first and second memory stacks ST1 and ST2. In the stack erase mode, the storage controller 11 may perform an erase operation on the first memory stack ST1 and/or the second memory stack ST2. Power consumption resulting from an erase operation according to the stack erase mode may be lower than power consumption resulting from an erase operation according to the block erase mode. Accordingly, in the low power mode, the storage controller 11 may adjust power consumption by controlling the stack erase operation and simultaneously prevent performance degradation of the storage device 10.

Figure 7:
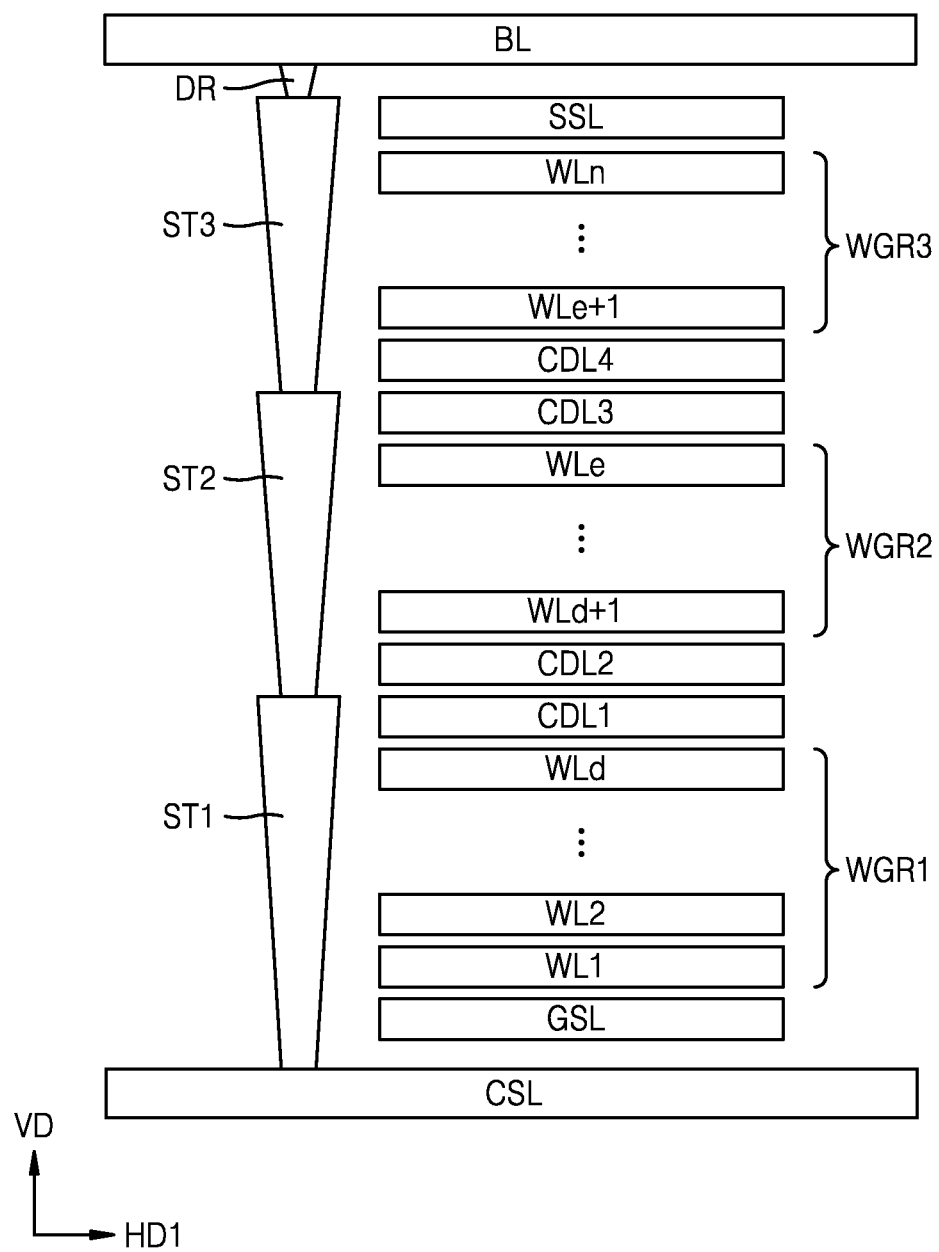

FIG. 7 schematically illustrates an NVM 70 according to an embodiment. The NVM 70 may include or may be similar in many respects to a modified example of the NVM 60 of FIG. 6, and may include additional features not mentioned above. Consequently, a redundant description thereof may be omitted.

Referring to FIG. 7, the NVM 70 may include memory stacks (e.g. first memory stack ST1, second memory stack ST2, and third memory stack ST3) extending in the vertical direction VD. That is, the first memory stack ST1 may be disposed on the upper portion of the common source line CSL, the second memory stack ST2 may be disposed on the upper portion of the first memory stack ST1, and the third memory stack ST3 may be disposed on the upper portion of the second memory stack ST2 and may be connected to the bit line BL through the drain DR. Alternatively or additionally, the NVM 70 may include first and second center dummy word lines CDL1 and CDL2 corresponding to a junction portion of the first and second memory stacks ST1 and ST2 and third and fourth center dummy word lines CDL3 and CDL4 corresponding to a junction portion of the second and third memory stacks ST2 and ST3.

In an embodiment, the first memory stack ST1 may be connected to the first word line group WGR1, the second memory stack ST2 may be connected to the second word line group WGR2, and the third memory stack ST3 may be connected to the third word line group WGR3. The first word line group WGR1 may include word lines WL1 to WLd, the second word line group WGR2 may include word lines WLd+1 to WLe, and the third word line group WGR3 may include word lines WLe+1 to WLn, where e is a positive integer between d and n. In some embodiments, word lines connected to at least one of the first to third memory stacks ST1, ST2, and ST3 may be grouped into a plurality of groups, and an erase operation may be independently performed for each group.

Referring to FIGS. 1 and 7 together, each block BLK may further include a third sub-block, and the word lines WL1 to WLd included in the first word line group WGR1 may be connected to the first sub-block SUB_BLK1, the word lines WLd+1 to WLe included in the second word line group WGR2 may be connected to the second sub-block SUB_BLK2, and the word lines WLe+1 to WLn included in the third word line group WGR3 may be connected to the third sub-block. The storage controller 11 may select one of a plurality of erase modes according to at least one of an operation schedule or power consumption of the NVM 70. In the block erase mode, the storage controller 11 may perform an erase operation on the block BLK including the first to third memory stacks ST1, ST2, and ST3. In the stack erase mode, the storage controller 11 may perform an erase operation on the first memory stack ST1, the second memory stack ST2, or the third memory stack ST3. In the multi-stack erase mode, the storage controller 11 may perform an erase operation on two of the first to third memory stacks ST1, ST2, and ST3. Consequently, power consumption resulting from an erase operation according to the stack erase mode may be lower than power consumption resulting from an erase operation according to the block erase mode. Alternatively or additionally, power consumption resulting from an erase operation according to the stack erase mode may be lower than power consumption resulting from an erase operation according to the multi-stack erase mode. Accordingly, in the low power mode, the storage controller 11 may adjust power consumption by controlling the stack erase operation and/or the multi-stack erase operation and simultaneously prevent performance degradation of the storage device 10.

In some embodiments, the NVM may include four or more memory stacks including first to fourth memory stacks extending in the vertical direction VD. For example, in the multi-stack erase mode, the NVM may simultaneously perform an erase operation on at least two memory stacks from among the four or more memory stacks. For example, in the two-stack erase mode, the NVM may simultaneously erase the first and fourth memory stacks, may simultaneously erase the second and third memory stacks, may simultaneously erase the second and fourth memory stacks, may simultaneously erase the first and third memory stacks, may simultaneously erase the first and second memory stacks, and/or may simultaneously erase the third and fourth memory stacks. For another example, in the three-stack erase mode, the NVM may simultaneously erase the first, second and fourth memory stacks, may simultaneously erase the second to fourth memory stacks, and/or may simultaneously erase the first, third, and fourth memory stacks.

Figure 8:
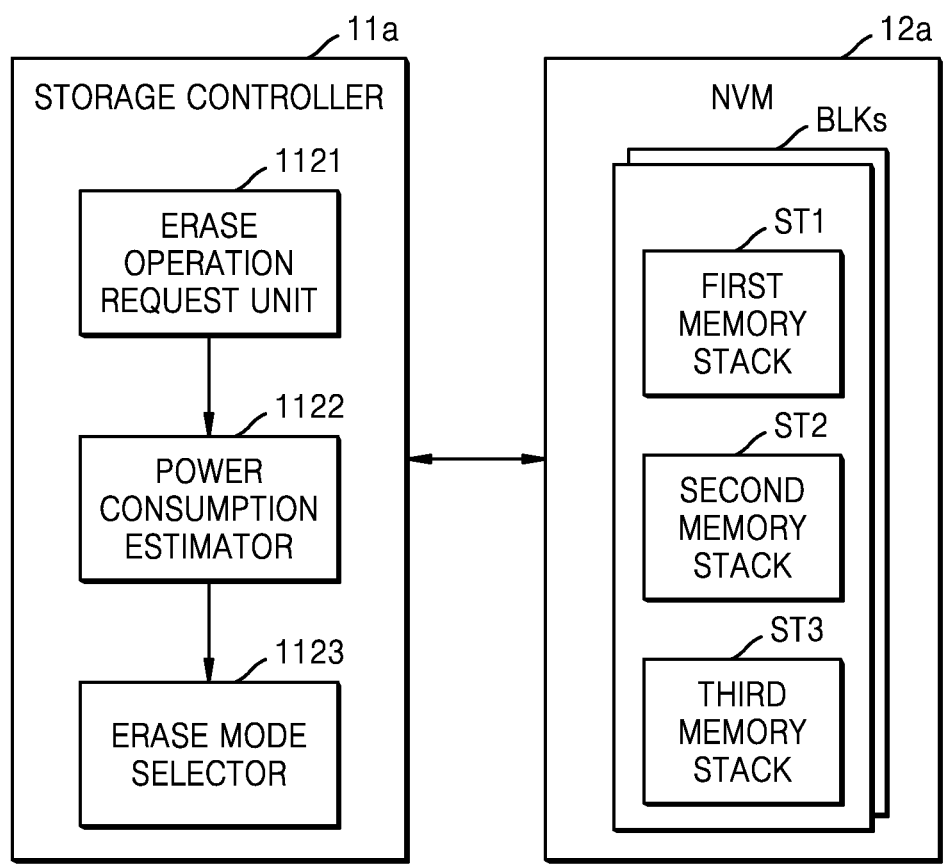
FIG. 8 is a block diagram illustrating a storage device, according to an embodiment.

FIG. 8 is a block diagram illustrating a storage device 80, according to an embodiment.

Referring to FIG. 8, the storage device 80 may include a storage controller 11a and an NVM 12a, and may include or may be similar in many respects to the storage device 10 described above with reference to FIG. 1, and may include additional features not mentioned above.

The NVM 12a may include a plurality of blocks BLKs. Each block BLK may include a plurality of memory stacks including the first to third memory stacks ST1, ST2, and ST3. Each of the first to third memory stacks ST1, ST2, and ST3 may include a plurality of memory cells arranged in a vertical direction. For example, the first to third memory stacks ST1, ST2, and ST3 may be respectively connected to the first to third word line groups WGR1, WGR2, and WGR3 of FIG. 7.

The storage controller 11a may include an erase operation request unit 1121, a power consumption estimator 1122, and an erase mode selector 1123. For example, the erase operation request unit 1121, the power consumption estimator 1122, and the erase mode selector 1123 may be included in the erase mode manager 112 of FIG. 1, but the present disclosure is not limited thereto. For example, the erase operation request unit 1121, the power consumption estimator 1122, and the erase mode selector 1123 may be loaded into an operational memory of the storage controller 11a, such as SRAM or DRAM, and executed by a processor (e.g., processor 111 of FIG. 1).

The erase operation request unit 1121 may request an erase operation with respect to the NVM 12a according to a request received from the host 20 and/or a background operation of the storage controller 11a. In an embodiment, the erase operation request unit 1121 may check a command queue in which commands received from the storage controller 11a are queued, and request an erase operation based on the commands queued in the command queue. For example, the request received from the host 20 may include a write request, a read request, and/or an erase request. For another example, a background operation of the storage controller 11a may include a garbage collection operation.

In an embodiment, the erase operation request unit 1121 may request an erase operation on the NVM 12a before performing a program operation according to the write request received from the host 20. In an optional or additional embodiment, the erase operation request unit 1121 may request an erase operation on the NVM 12a according to the erase request received from the host 20. In another optional or additional embodiment, the erase operation request unit 1121 may request an erase operation on the NVM 12a in order to secure a free block in the NVM 12a. In another optional or additional embodiment, the erase operation request unit 1121 may request an erase operation on the NVM 12a according to the garbage collection operation.

The power consumption estimator 1122 may estimate power consumption when an erase operation request occurs. That is, the power consumption estimator 1122 may estimate power consumption when an erase operation request is received from the erase operation request unit 1121. For example, the power consumption may include power consumption of the storage device 80, power consumption of the NVM 12a, current power consumption, future power consumption, and the like. However, the present disclosure is not limited thereto. For example, in some embodiments, the power consumption estimator 1122 may estimate the amount of heat generated by the storage device 80, the amount of heat generated by the NVM 12a, the amount of currently generated heat, the amount of heat generated in the future, and the like. Alternatively or additionally, in some embodiments, the power consumption estimator 1122 may estimate the temperature of the storage device 80, the temperature of the NVM 12a, the current temperature, the future temperature, and the like.

In an embodiment, the power consumption estimator 1122 may check an operation schedule of the NVM 12a and estimate power consumption based on the checked operation schedule. For example, the power consumption estimator 1122 may check the operation schedule of the NVM 12a from the command queue of the storage controller 11a. Alternatively or additionally, the power consumption estimator 1122 may estimate power consumption based on the type and/or number of commands queued in the command queue. For example, when an intensive read operation and/or program operation is performed on the NVM 12a, the power consumption estimator 1122 may determine that the power consumption is high (e.g., greater than or equal to a threshold value).

The erase mode selector 1123 may select one of a plurality of erase modes based on power consumption. For example, when an erase operation request occurs, the erase mode selector 1123 may compare the amount of power consumption received from the power consumption estimator 1122 with a threshold value, and select one of a plurality of erase modes according to a comparison result. The erase mode selector 1123 may select a full block erase mode or a block erase mode when power consumption is smaller than a threshold value. In the block erase mode, the erase mode selector 1123 may control an erase operation on a selected block among the plurality of blocks BLKs of the NVM 12a.

Alternatively or additionally, the erase mode selector 1123 may select a sub-block erase mode when the power consumption is greater than or equal to a threshold value. When the sub-block erase mode is the stack erase mode, the erase mode selector 1123 may control an erase operation on one of the first to third memory stacks ST1, ST2, and ST3 included in the selected block of the NVM 12a. When the sub-block erase mode is the multi-stack erase mode, the erase mode selector 1123 may control an erase operation on two of the first to third memory stacks ST1, ST2, and ST3 included in the selected block of the NVM 12a.

As described above, the storage controller 11a may determine a power mode as a normal power mode or a low power mode by checking the operation schedule and power consumption of the NVM 12a. The storage controller 11a may select a block erase mode in the normal power mode and control an erase operation on the NVM 12a according to the selected block erase mode. Alternatively or additionally, the storage controller 11a may select a sub-block erase mode in the low power mode and control an erase operation on the NVM 12a according to the selected sub-block erase mode.

For example, the storage controller 11a may select the sub-block erase mode instead of the block erase mode in the low power mode in which the power consumption is greater than or equal to the threshold value, and control an erase operation on at least one sub-block or memory stack included in the NVM 12a according to the selected sub-block erase mode. As described above, the storage controller 11a may determine the NVM 12a not to be in an idle state in the low power mode and may apply power throttling to perform a sub-block erase operation on some memory chips, memory dies, and/or memory planes of the NVM 12a, thereby improving performance of the storage device 10a.

Figure 9:
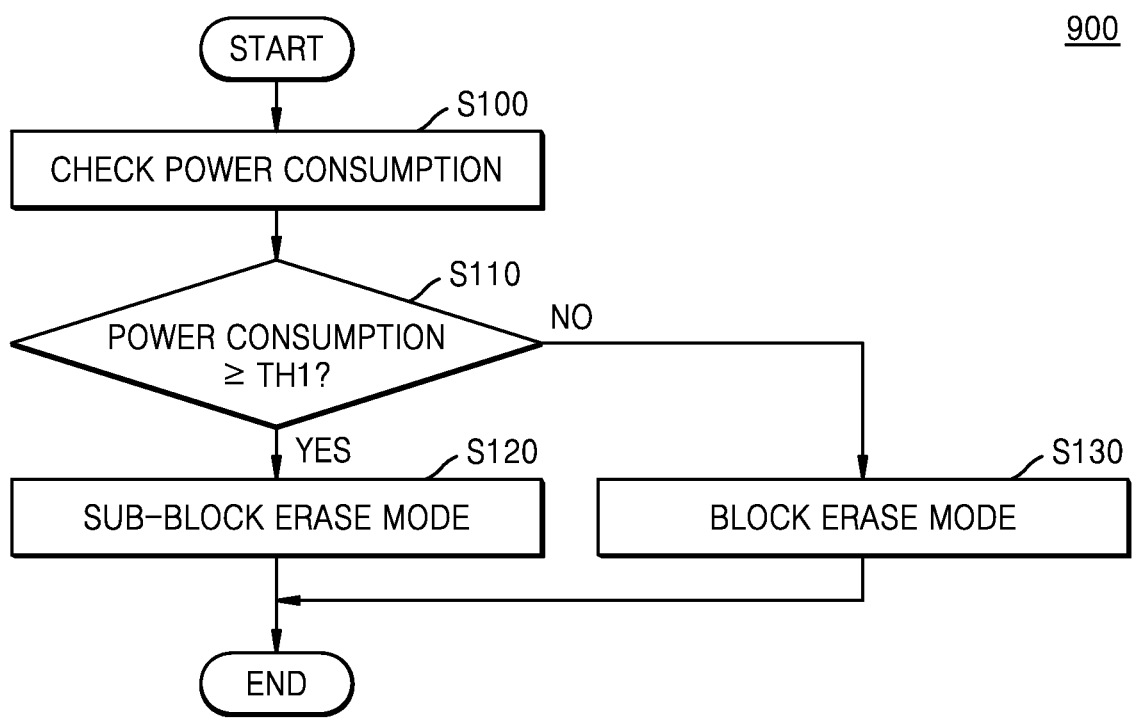
FIG. 9 is a flowchart illustrating a method of operating a storage device, according to an embodiment.
Figure 10A:
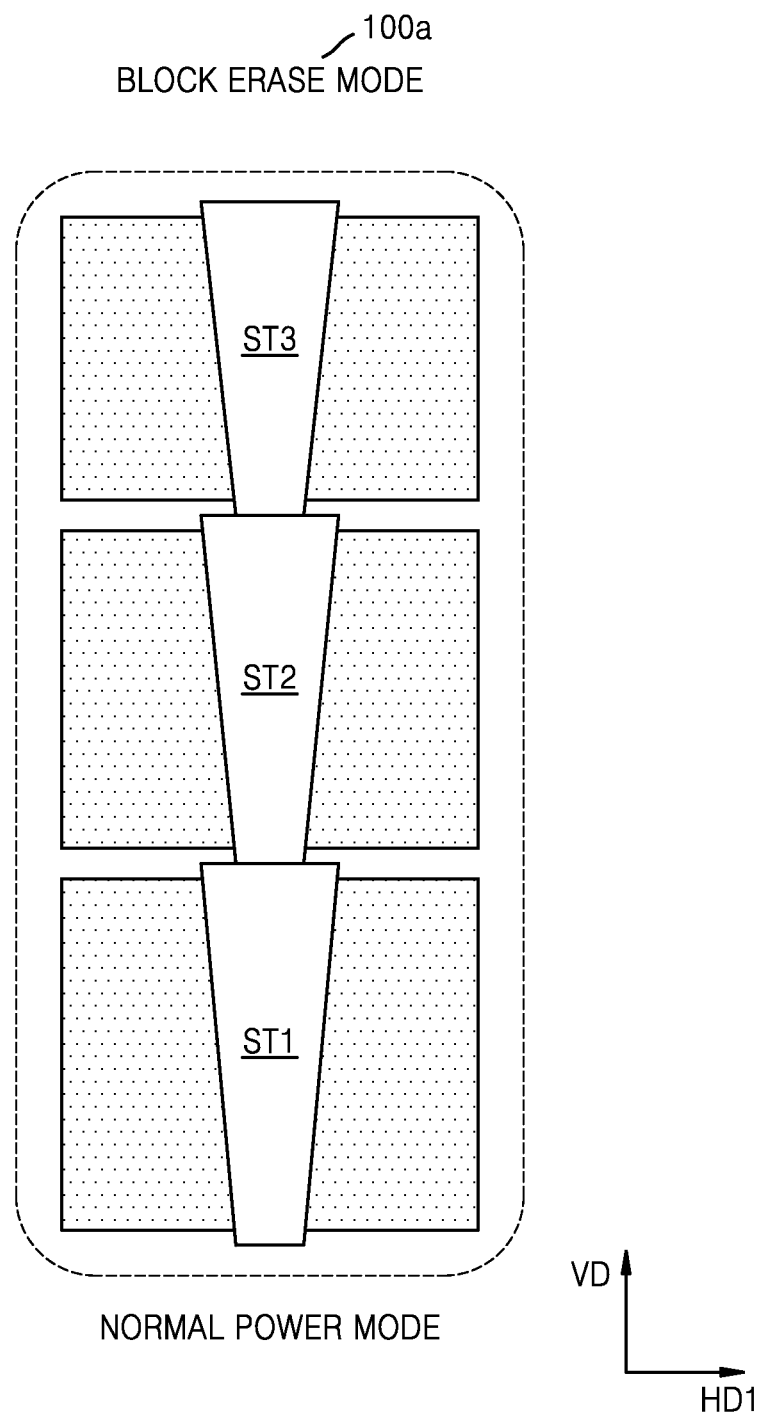
FIG. 10A shows a block erase mode, according to an embodiment.

FIG. 9 is a flowchart illustrating a method of operating a storage device, according to an embodiment. FIG. 10A shows a block erase mode 100a according to an embodiment, and FIG. 10B shows a sub-block erase mode 100b according to an embodiment.

Figure 10B:
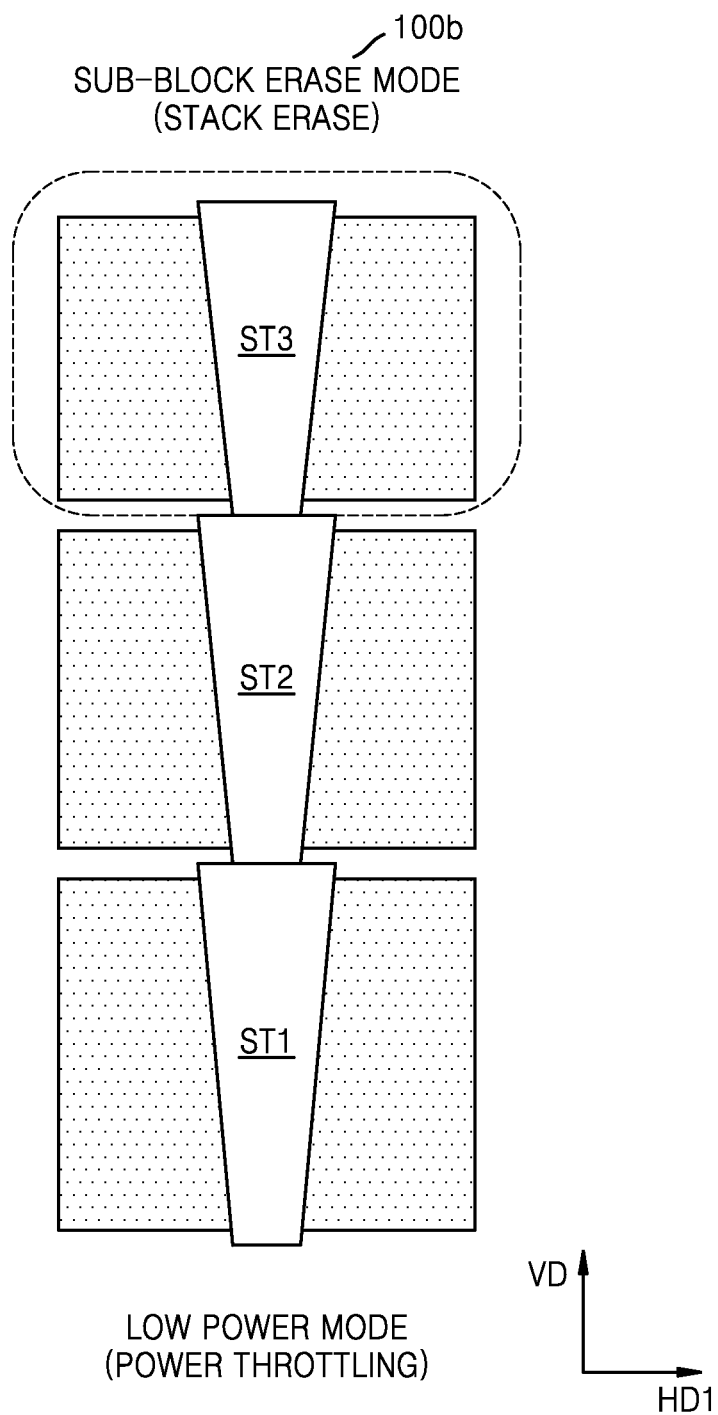
FIG. 10B shows a sub-block erase mode, according to an embodiment.

Referring to FIGS. 9 to 10B together, the operating method 900, according to the present disclosure, may correspond to a method of operating a storage device when an erase operation on an NVM is requested. For example, the operating method 900 may include operations performed time-sequentially by the storage device 80 of FIG. 8, and the descriptions given above with reference to FIG. 8 may also be applied to the present description.

In operation S100, the storage controller 11a may check power consumption as described with reference to FIG. 8. In operation S110, the storage controller 11a may determine whether the power consumption is greater than or equal to a first threshold value TH1. For example, the first threshold value TH1 may be previously determined. Alternatively or additionally, the first threshold value TH1 may be changed during operation of the storage device 80.

As a result of determination, when the power consumption is greater than or equal to the first threshold value TH1 (YES in operation S110), in operation S120, the storage controller 11a may select the sub-block erase mode 100b, and according to the sub-block erase mode 100b, may control an erase operation on the NVM 12a for each sub-block. For example, the NVM 12a may perform an erase operation on the third memory stack ST3 among the first to third memory stacks ST1, ST2, and ST3 according to the sub-block erase mode 100b. However, the present disclosure is not limited thereto, and the NVM 12a may perform an erase operation on the first memory stack ST1 and/or the second memory stack ST2 among the first to third memory stacks ST1, ST2, and ST3 according to the sub-block erase mode 100b.

Alternatively or additionally, as a result of determination, when the power consumption is less than the first threshold value TH1 (NO in operation S110), in operation S130, the storage controller 11a may select the block erase mode 100a, and according to the block erase mode 100a, may control an erase operation on the NVM 12a for each block. For example, the NVM 12a may perform an erase operation on a block including the first to third memory stacks ST1, ST2, and ST3 according to the block erase mode 100a. In some embodiments, as a result of determination, when the power consumption is less than the first threshold value TH1, in operation S130, the storage controller 11a may select a full block erase mode, and according to the full block erase mode, may control an erase operation on the NVM 12a for the full block.

Figure 11:
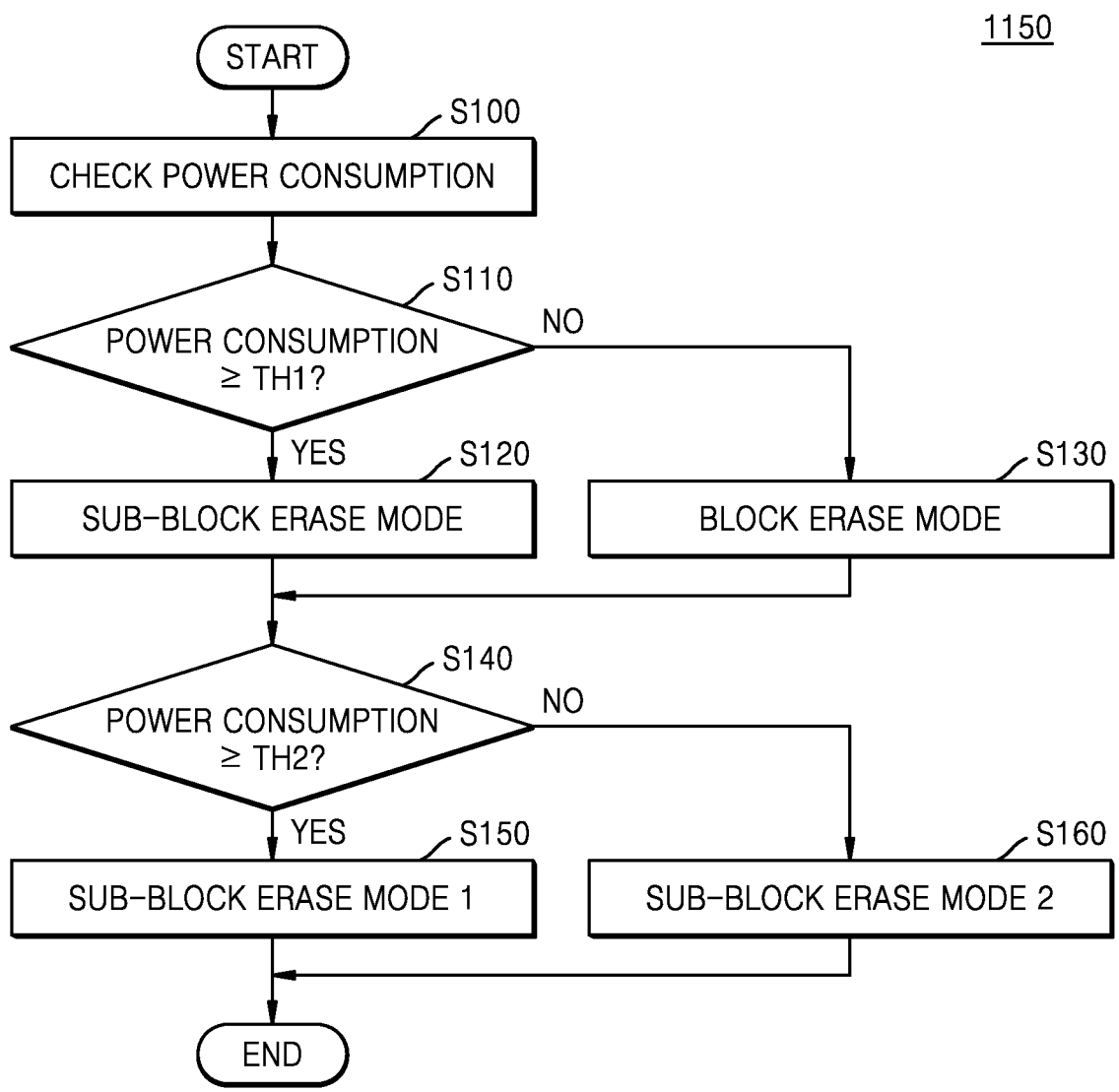
FIG. 11 is a flowchart illustrating a method of operating a storage device, according to an embodiment.
Figure 12A:
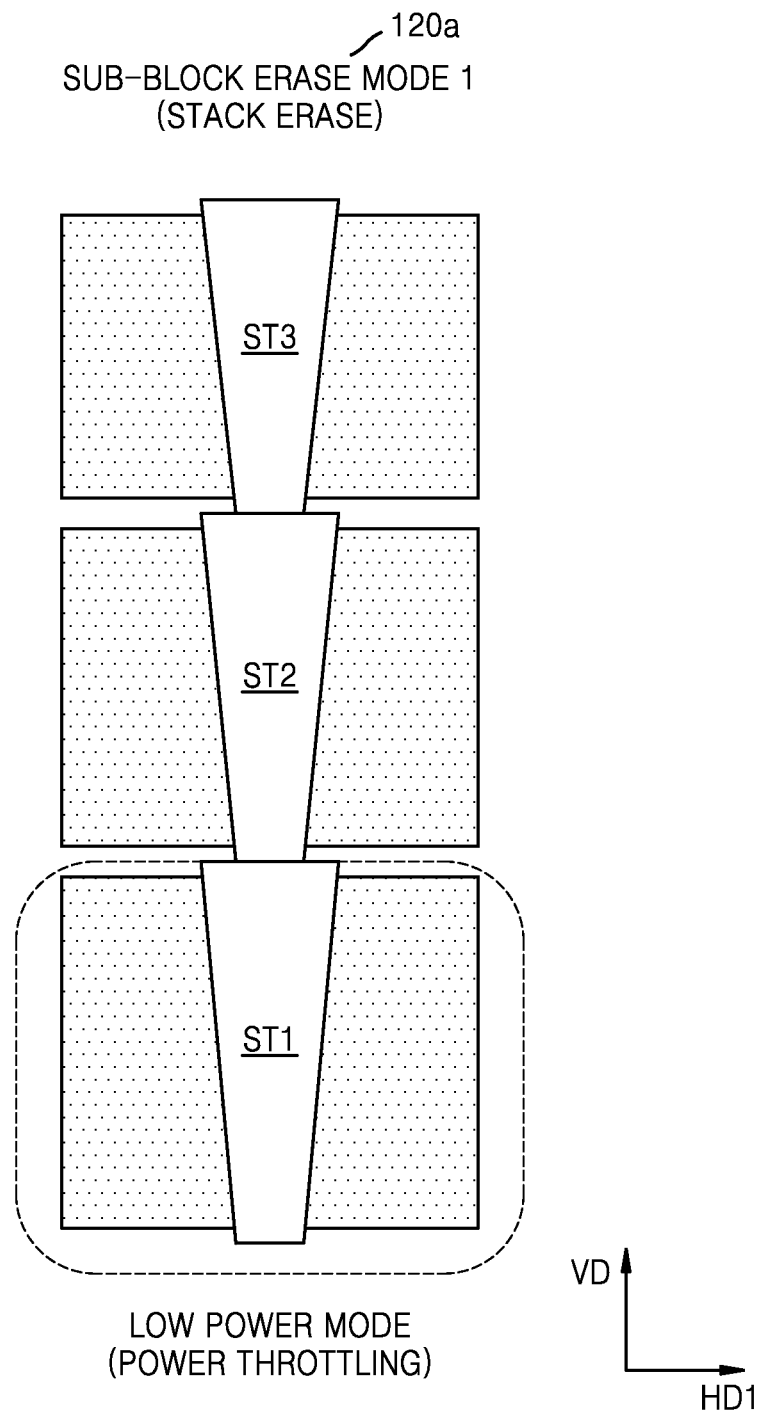
FIG. 12A shows a first sub-block erase mode, according to an embodiment.

FIG. 11 is a flowchart illustrating a method of operating a storage device, according to an embodiment. FIG. 12A shows a first sub-block erase mode 120a according to an embodiment, and FIG. 12B shows a second sub-block erase mode 120b according to an embodiment.

Figure 12B:
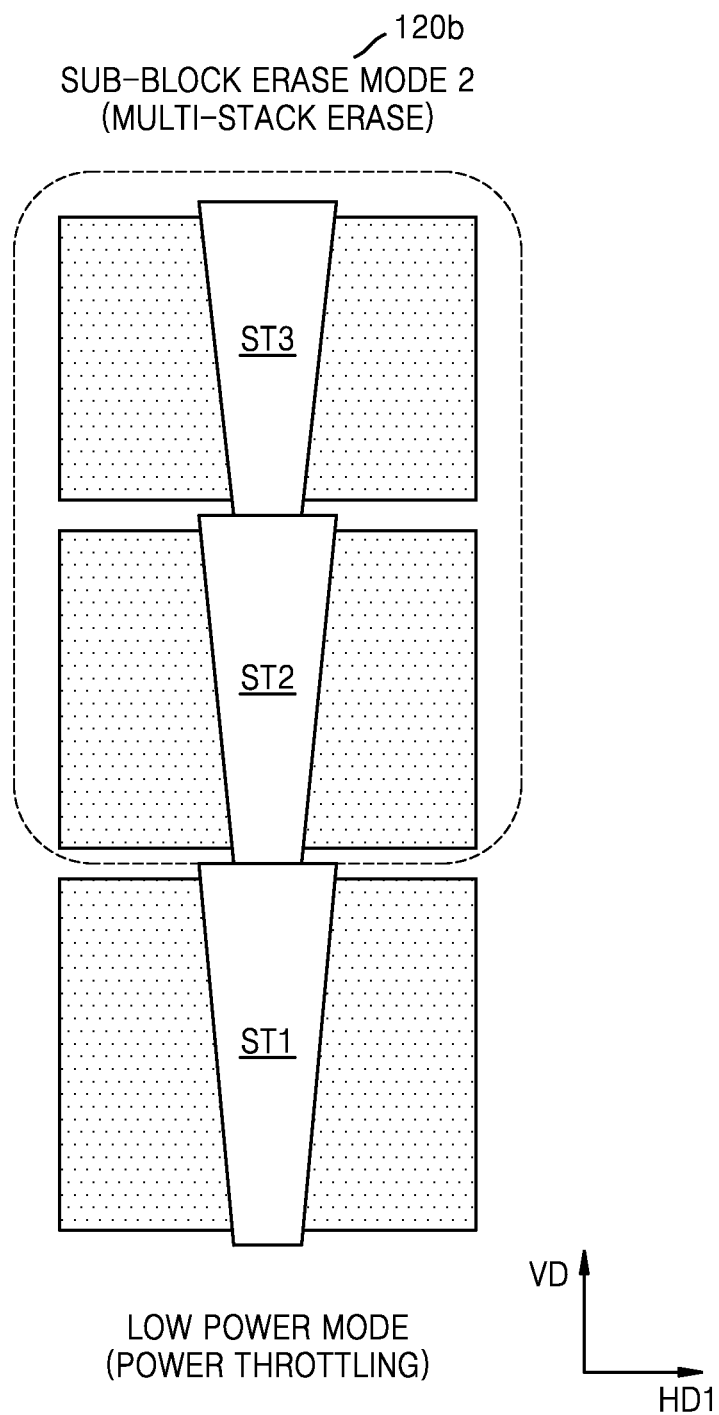
FIG. 12B shows a second sub-block erase mode, according to an embodiment.

Referring to FIGS. 11 to 12B together, the operation method 1150, according to the present disclosure, may correspond to a modified example of the operation method 900 of FIG. 9, and a redundant description thereof may be omitted.

In operation S140, the storage controller 11a may determine whether power consumption is greater than or equal to a second threshold value TH2. In an embodiment, the second threshold value TH2 may be greater than the first threshold value TH1. For example, the second threshold value TH2 may be previously determined. Alternatively or additionally, the second threshold value TH2 may be changed during operation of the storage device 80.

As a result of the determination, when the power consumption is greater than or equal to the second threshold value TH2 (YES in operation S140), in operation S150, the storage controller 11a may select the first sub-block erase mode 120a, and according to the first sub-block erase mode 120a, may control an erase operation on the NVM 12a for each sub-block. In an embodiment, the first sub-block erase mode 120a may correspond to a stack erase mode. For example, the NVM 12a may perform an erase operation on the first memory stack ST1 according to the first sub-block erase mode 120a. However, the present disclosure is not limited thereto. For example, the NVM 12a may perform an erase operation on the second memory stack ST2 and/or the third memory stack ST3 according to the first sub-block erase mode 120a.

Alternatively or additionally, as a result of the determination, when the power consumption is less than the second threshold value TH2 (NO in operation S140), in operation S160, the storage controller 11a may select the second sub-block erase mode 120b, and according to the second sub-block erase mode 120b, may control an erase operation on the NVM 12a for a plurality of sub-blocks. In an embodiment, the second sub-block erase mode 120b may correspond to a multi-stack erase mode. For example, the NVM 12a may perform an erase operation on the second and third memory stacks ST2 and ST3 according to the second sub-block erase mode 120b. However, the present disclosure is not limited thereto. For example, the NVM 12a may perform an erase operation on the first and third memory stacks ST1 and ST3 and/or the first and second memory stacks ST1 and ST2, according to the second sub-block erase mode 120b.

Figure 13:
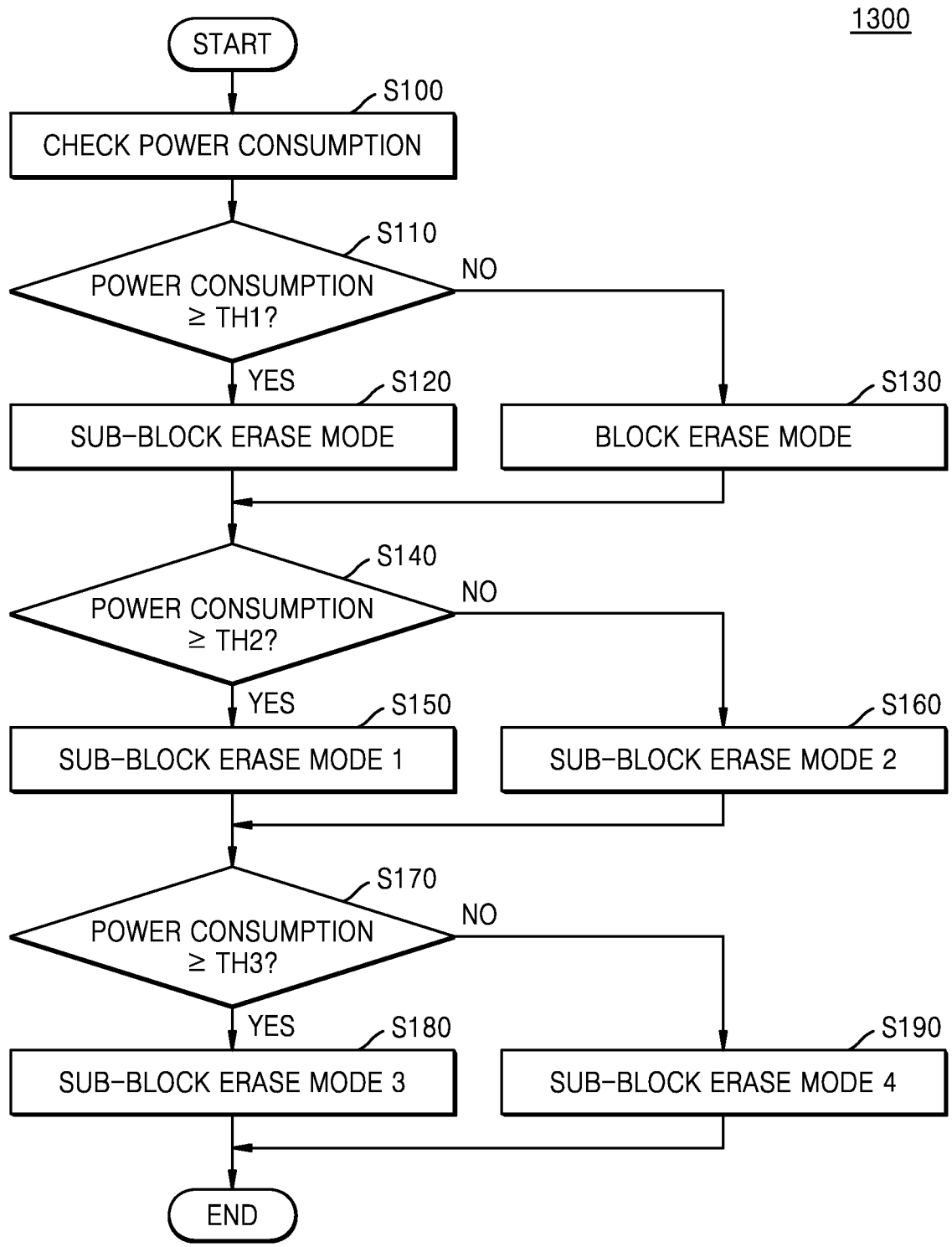
FIG. 13 is a flowchart illustrating a method of operating a storage device, according to an embodiment.
Figure 14A:
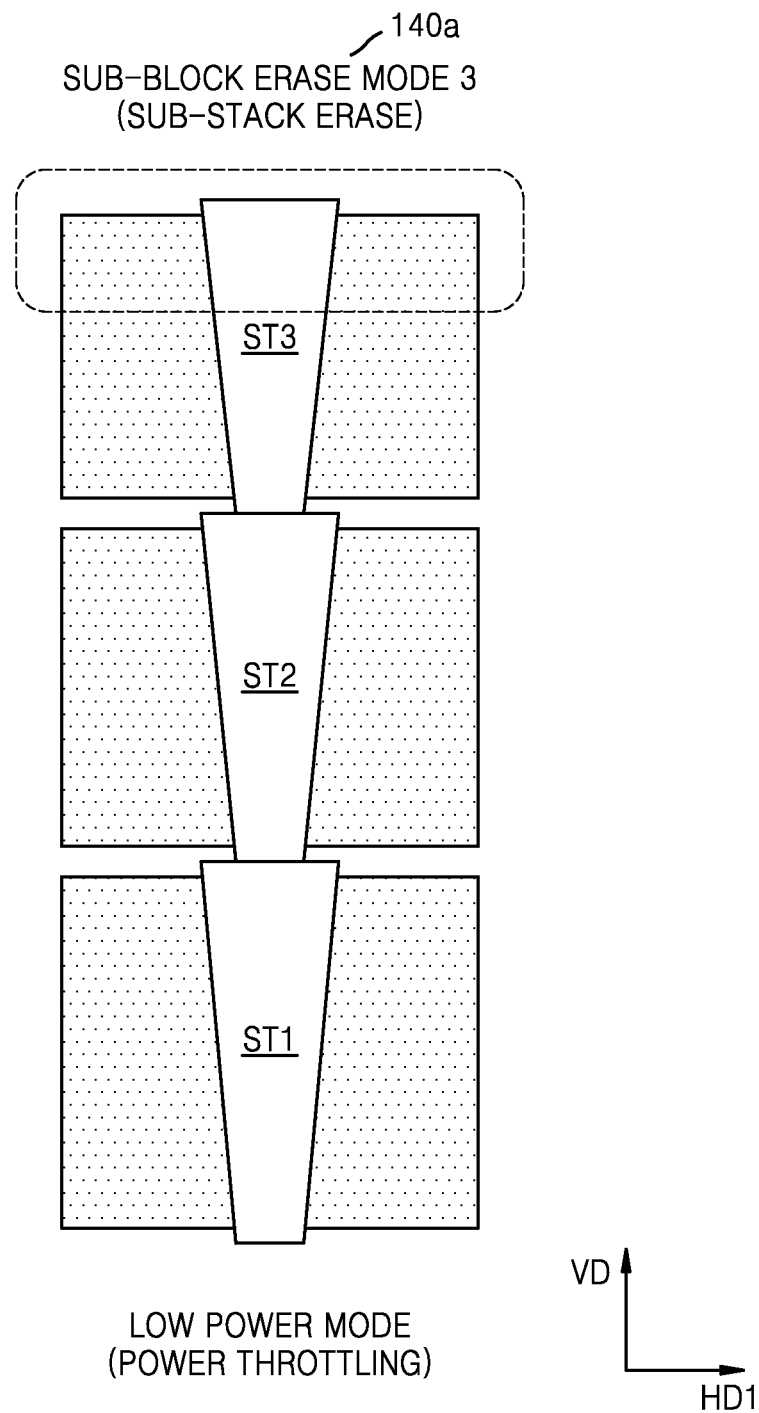
FIG. 14A shows a third sub-block erase mode, according to an embodiment.

FIG. 13 is a flowchart illustrating a method of operating a storage device, according to an embodiment. FIG. 14A shows a third sub-block erase mode 140a according to an embodiment, and FIG. 14B shows a fourth sub-block erase mode 140b according to an embodiment.

Figure 14B:
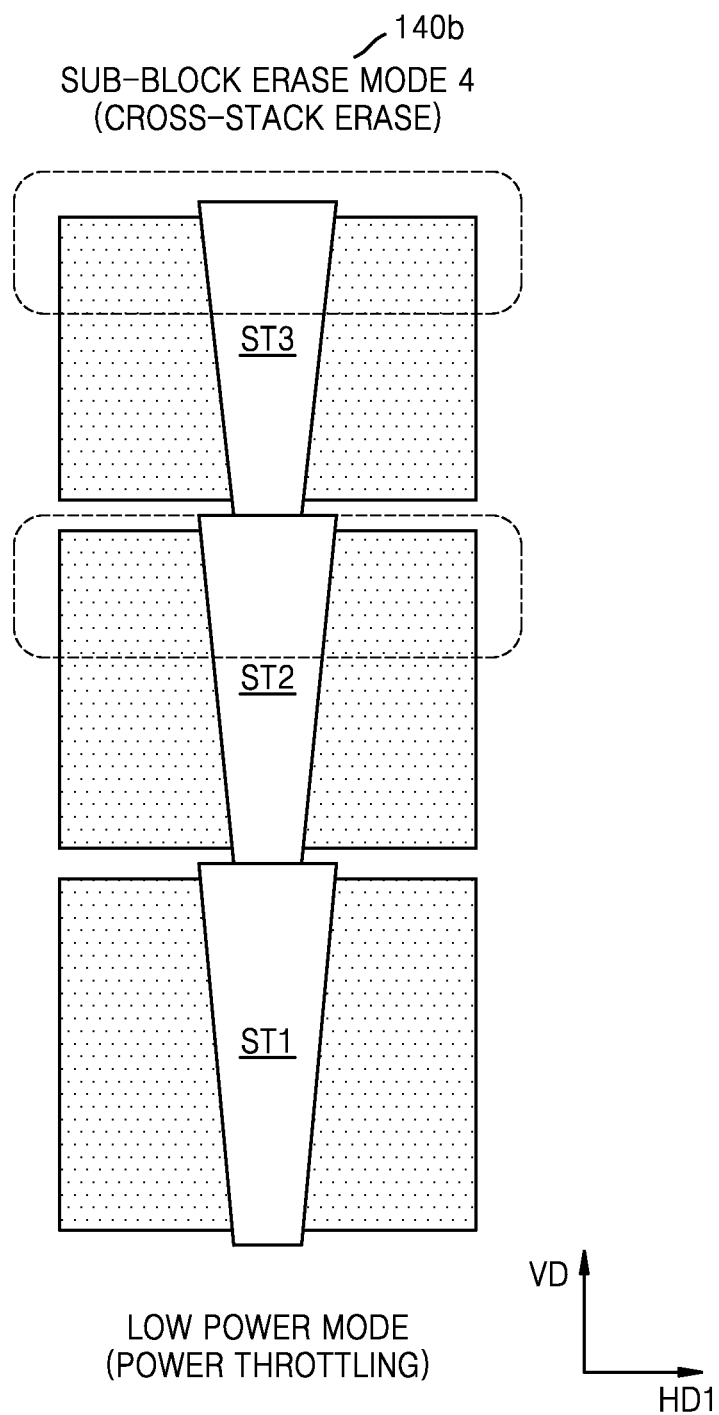
FIG. 14B shows a fourth sub-block erase mode, according to an embodiment.

Referring to FIGS. 13 to 14B together, the operation method 1300, according to the present disclosure, may correspond to a modified example of the operation method 1150 of FIG. 11, and a redundant description thereof may be omitted.

In operation S170, the storage controller 11a may determine whether the power consumption is greater than or equal to a third threshold value TH3. In an embodiment, the third threshold value TH3 may be greater than the second threshold value TH2. In an optional or additional embodiment, the third threshold value TH3 may be previously determined. Alternatively or additionally, the third threshold value TH3 may be changed during operation of the storage device 80.

As a result of the determination, when the power consumption is greater than or equal to the third threshold value TH3 (YES in operation S170), in operation S180, the storage controller 11a may select the third sub-block erase mode 140a, and according to the third sub-block erase mode 140a, may control an erase operation on the NVM 12a for each group in a memory stack. In an embodiment, the third sub-block erase mode 140a may correspond to a sub-stack erase mode. For example, the NVM 12a may perform an erase operation on at least one group included in the third memory stack ST3 according to the third sub-block erase mode 140a. However, the present disclosure is not limited thereto. For example, the NVM 12a may perform an erase operation on at least one group included in the second memory stack ST2 and/or at least one group included in the first memory stack ST1, according to the third sub-block erase mode 140a.

Alternatively or additionally, as a result of the determination, when the power consumption is less than the third threshold TH3 (NO in operation S170), in operation S190, the storage controller 11a may select the fourth sub-block erase mode 140b, and according to the fourth sub-block erase mode 140b, may control an erase operation on the NVM 12a for each group included in each of different memory stacks. In an embodiment, the fourth sub-block erase mode 140b may correspond to a cross-stack erase mode. For example, the NVM 12a may perform an erase operation on groups included in each of the second and third memory stacks ST2 and ST3 according to the fourth sub-block erase mode 140b. However, the present disclosure is not limited thereto. For example, the NVM 12a may perform an erase operation on groups included in each of the first and third memory stacks ST1 and ST3 and/or groups included in each of the first and second memory stacks ST1 and ST2, according to the fourth sub-block erase mode 140b.

Figure 15:
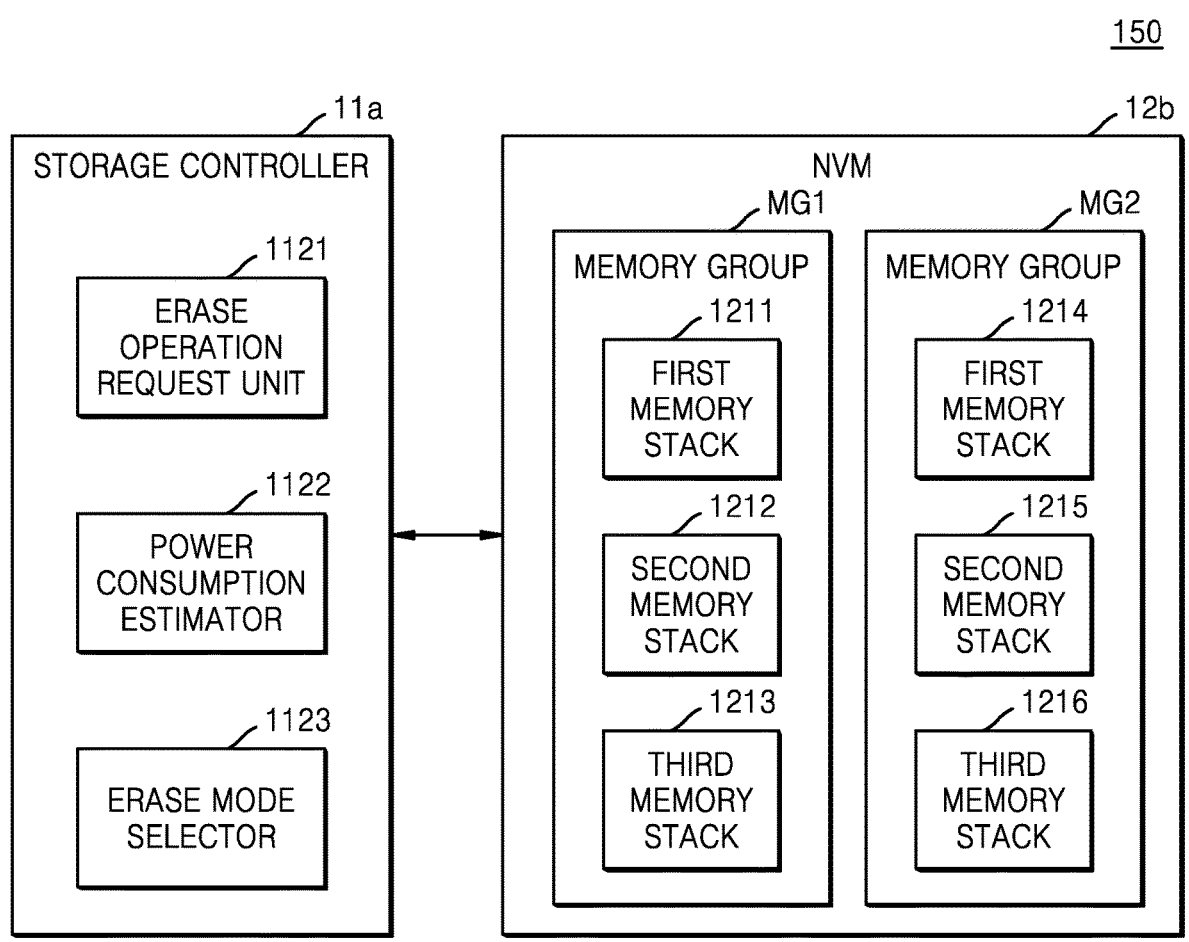
FIG. 15 is a block diagram illustrating a storage device, according to an embodiment.

FIG. 15 is a block diagram illustrating a storage device 150, according to an embodiment.

Referring to FIG. 15, the storage device 150 may include the storage controller 11a and the NVM 12b. The storage device 150 may include or may be similar in many respects to a modified example of the storage device 80 of FIG. 8, and may include additional features not mentioned above. Consequently, detailed descriptions given above with reference to FIGS. 8 to 14B may also be applied to the storage device 150.

The NVM 12b may include a plurality of memory groups including first and second memory groups MG1 and MG2. According to some embodiments, a plurality of memory groups may be referred to as a plurality of NVMs. The first memory group MG1 may include a plurality of memory stacks including first to third memory stacks 1211, 1212, and 1213, and the second memory group MG2 may include a plurality of memory stacks including first to third memory stacks 1214, 1215, and 1216.

The storage controller 11a may select erase modes respectively corresponding to the first and second memory groups MG1 and MG2, and independently perform an erase operation on the first and second memory groups MG1 and MG2.

For example, the storage controller 11a may control an erase operation on the first memory group MG1 according to a first erase mode and an erase operation on the second memory group MG2 according to a second erase mode. That is, when an erase operation is performed on the NVM 12b according to the sub-block erase mode, and a free space corresponding to a block unit is required, the storage controller 11a may perform a sub-block erase operation on a plurality of blocks and/or a plurality of memory groups.

In an embodiment, the first and second memory groups MG1 and MG2 may respectively correspond to first and second memory chips. Alternatively or additionally, the storage controller 11a may control an erase operation for each memory chip according to erase modes respectively corresponding to the first and second memory chips. In an optional or additional embodiment, the first and second memory groups MG1 and MG2 may respectively correspond to first and second memory dies, and the storage controller 11a may control an erase operation for each memory die according to erase modes respectively corresponding to the first and second memory dies. In such an embodiment, the memory chip may include a plurality of memory dies.

For another example, the first and second memory groups MG1 and MG2 may respectively correspond to first and second memory planes, and the storage controller 11a may control an erase mode for each memory plane according to erase modes respectively corresponding to the first and second memory planes. In such an example, the memory die may include a plurality of memory planes, and operations on the plurality of memory planes may be independently performed.

Figure 16:
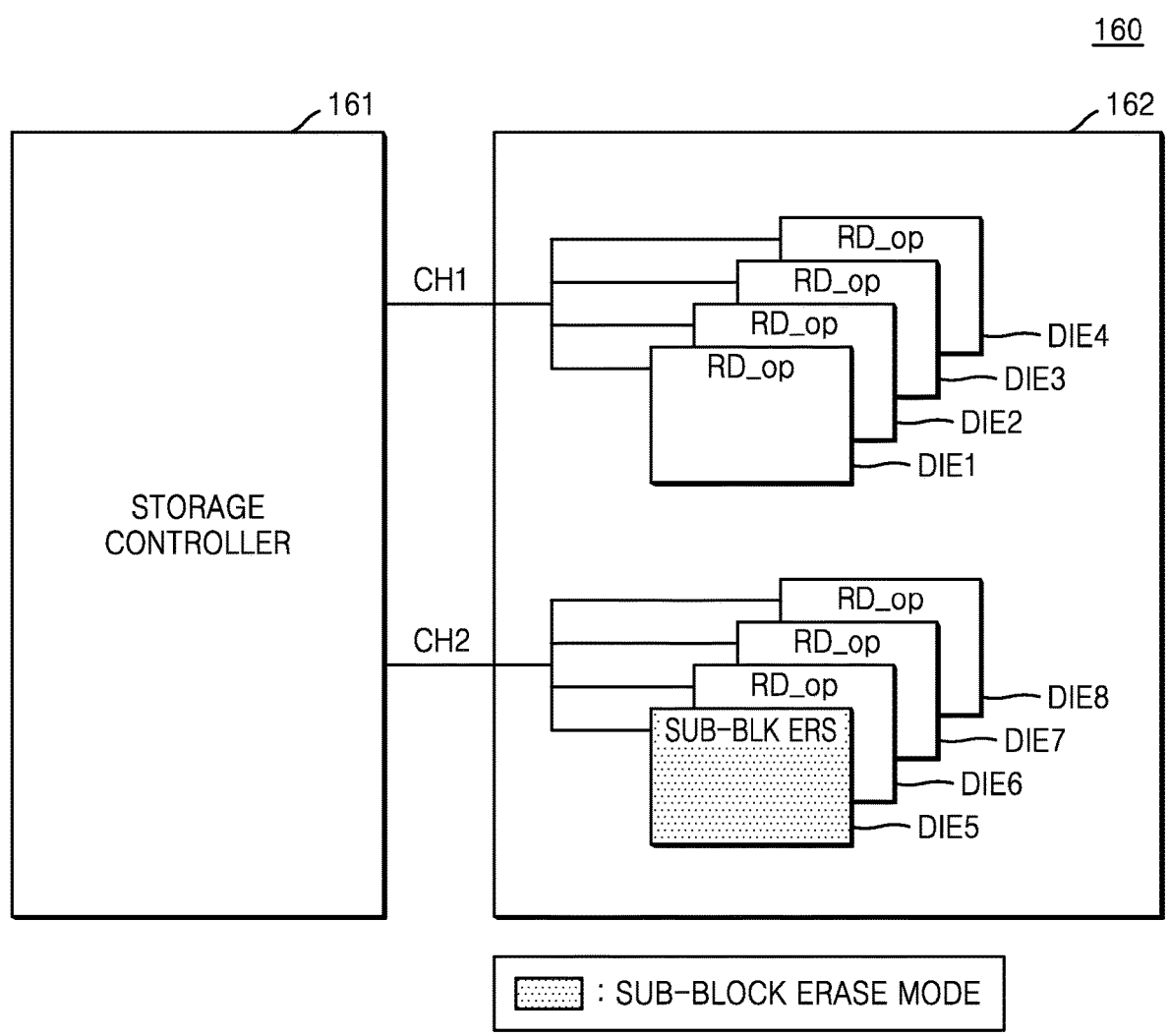
FIGS. 16 and 17 each illustrate a storage device controlling an erase mode for each memory die, according to some embodiments.

FIG. 16 illustrates a storage device 160 controlling an erase mode for each memory die, according to an embodiment.

Referring to FIG. 16, the storage device 160 may include a storage controller 161 and an NVM 162. The storage controller 161 may include or may be similar in many respects to an example of the storage controller 11a of FIG. 15, and the NVM 162 may include or may be similar in many respects to an example of the NVM 12b of FIG. 15.

In an embodiment, the NVM 162 may include first to eighth memory dies DIE1 to DIE8. In such an embodiment, the first to eighth memory dies DIE1 to DIE8 may correspond to an example of the plurality of memory groups of FIG. 15. For example, the first to fourth memory dies DIE1 to DIE4 may communicate with the storage controller 161 through a first channel CH1, and the fifth to eighth memory dies DIE5 to DIE8 may communicate with the storage controller 161 through a second channel CH2.

For example, when a read operation RD_op is performed on the first to fourth memory dies DIE1 to DIE4 and the sixth to eighth memory dies DIE6 to DIE8, the storage controller 161 may determine that an intensive read operation is performed on the volatile memory 162. In such an example, the storage controller 161 may determine the erase mode of the fifth memory die DIE5 as a sub-block erase mode SUB-BLK ERS, and may perform an erase operation on at least one sub-block of a selected block included in the fifth memory die DIE5.

However, the present disclosure is not limited thereto. For example, when a program operation is performed on the first to fourth memory dies DIE1 to DIE4 and the sixth to eighth memory dies DIE6 to DIE8, the storage controller 161 may determine that an intensive program operation is performed on the volatile memory 162. In such an example, the storage controller 161 may determine the erase mode of the fifth memory die DIE5 as the sub-block erase mode SUB-BLK ERS, and may perform an erase operation on at least one sub-block of the selected block included in the fifth memory die DIE5.

Figure 17:
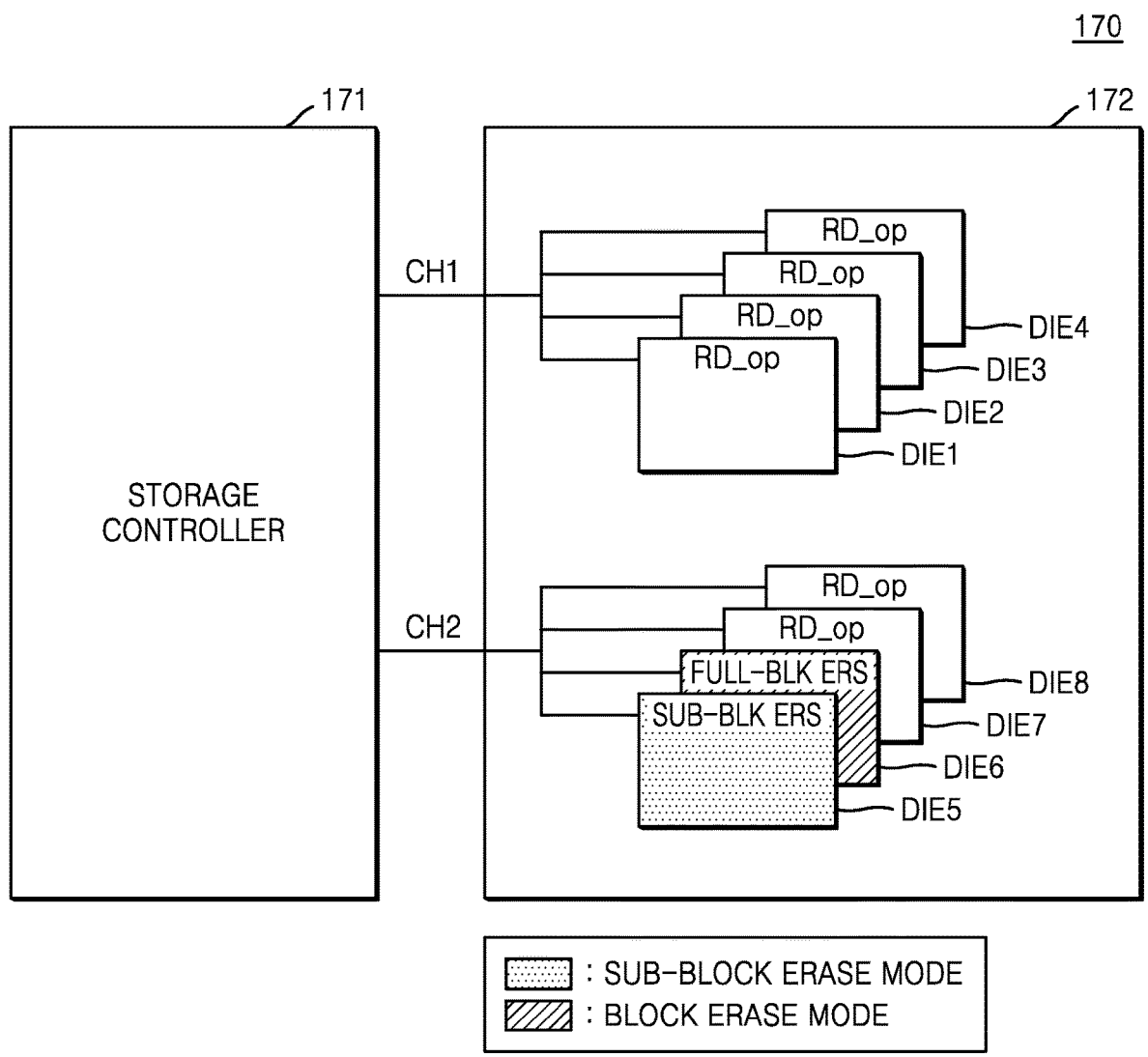

FIG. 17 illustrates a storage device 170 controlling an erase mode for each memory die, according to an embodiment.

Referring to FIG. 17, the storage device 170 may include a storage controller 171 and an NVM 172. The storage device 170 may include or may be similar in many respects to a modified example of the storage device 160 of FIG. 16, and may include additional features not mentioned above. Consequently, a redundant description thereof may be omitted.

In an embodiment, when the read operation RD_op is performed on the first to fourth memory dies DIE1 to DIE4 and the seventh and eighth memory dies DIE7 and DIE8, the storage controller 171 may determine that an intensive read operation is performed on the NVM 172. In such an embodiment, the storage controller 171 may determine the erase mode of the fifth memory die DIE5 as the sub-block erase mode SUB-BLK ERS, and may perform an erase operation on at least one sub-block of a selected block included in the fifth memory die DIE5. Alternatively or additionally, the storage controller 171 may determine the erase mode of the sixth memory die DIE6 as a full block erase mode FULL-BLK ERS and/or a block erase mode, and may perform an erase operation on a selected block and/or full blocks included in the sixth memory die DIE6.

Figure 18:
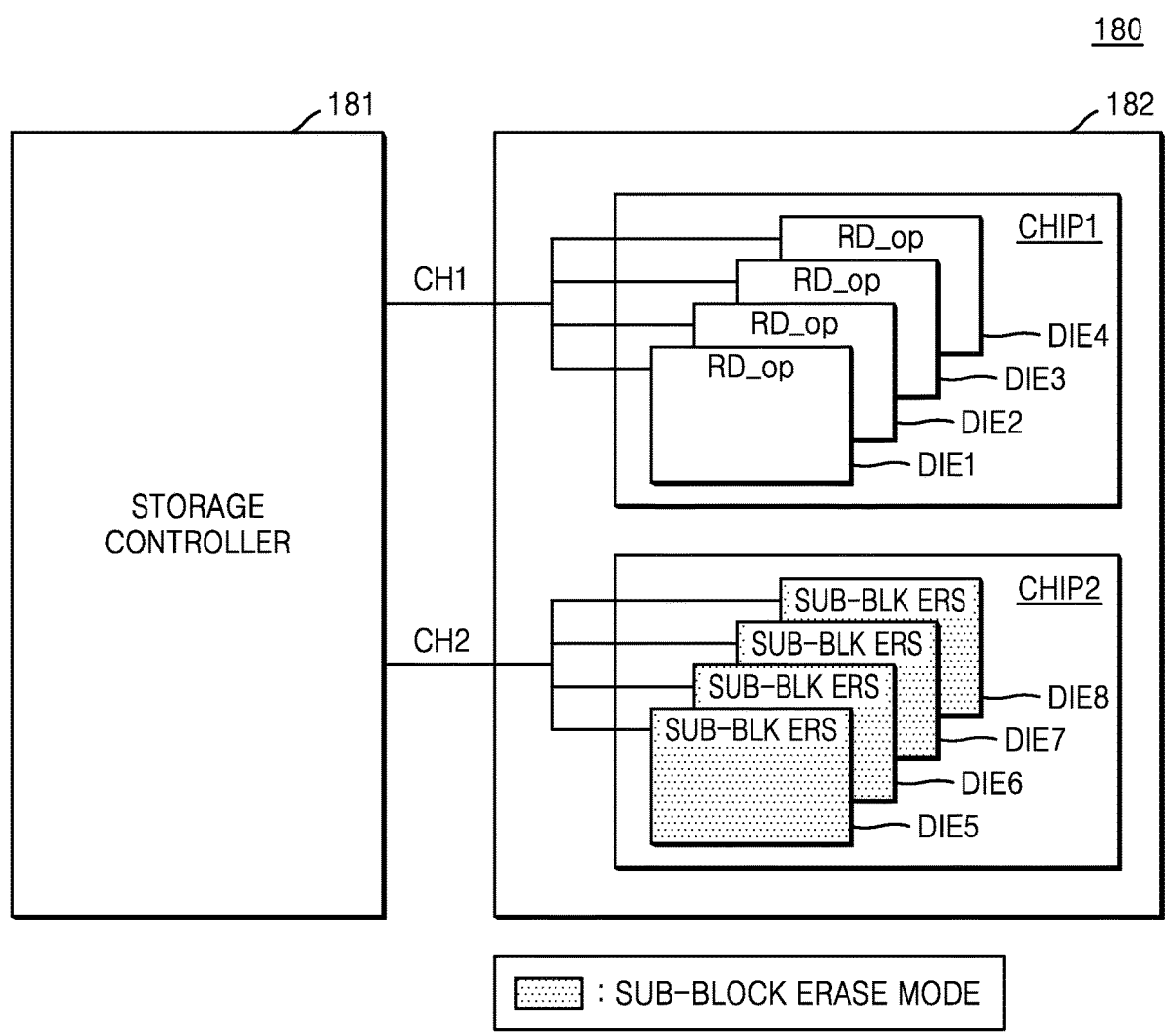
FIGS. 18 and 19 each illustrate a storage device controlling an erase mode for each memory chip, according to some embodiments.

FIG. 18 illustrates a storage device 180 controlling an erase mode for each memory chip, according to an embodiment.

Referring to FIG. 18, the storage device 180 may include a storage controller 181 and an NVM 182. The storage controller 181 may include or may be similar in many respects to an example of the storage controller 11a of FIG. 15, and the NVM 182 may include or may be similar in many respects to an example of the NVM 12b of FIG. 15, and may include additional features not mentioned above.

In an embodiment, the NVM 182 may include a first memory chip CHIP1 and a second memory chip CHIP2. In such an embodiment, the first and second memory chips CHIP1 and CHIP2 may correspond to an example of the plurality of memory groups of FIG. 15. For example, the first memory chip CHIP1 may communicate with the storage controller 181 through the first channel CH1, and the second memory chip CHIP2 may communicate with the storage controller 181 through the second channel CH2. For another example, the first memory chip CHIP1 may include the first to fourth memory dies DIE1 to DIE4, and the second memory chip CHIP2 may include the fifth to eighth memory dies DIE5 to DIE8.

When an intensive read operation or program operation is performed on the first memory chip CHIP1 (e.g., when the read operation RD_op is performed on the first to fourth memory dies DIE1 to DIE4 of the first memory chip CHIP1), the storage controller 181 may determine that an intensive read operation is performed on the NVM 182 (e.g., the first memory chip CHIP1). In such an example, the storage controller 181 may determine the erase mode of the second memory chip CHIP2 as the sub-block erase mode SUB-BLK ERS, and may control an erase operation with respect to the fifth to eighth memory dies DIE5 to DIE8 included in the second memory chip CHIP2 for each sub-block.

However, the present disclosure is not limited thereto. For example, when a program operation is performed on the first to fourth memory dies DIE1 to DIE4 of the first memory chip CHIP1, the storage controller 181 may determine that an intensive program operation is performed on the NVM 182 (e.g., the first memory chip CHIP1). In such an example, the storage controller 181 may determine the erase mode of the second memory chip CHIP2 as the sub-block erase mode SUB-BLK ERS, and may control an erase operation with respect to the fifth to eighth memory dies DIE5 to DIE8 included in the second memory chip CHIP2 for each sub-block.

Figure 19:
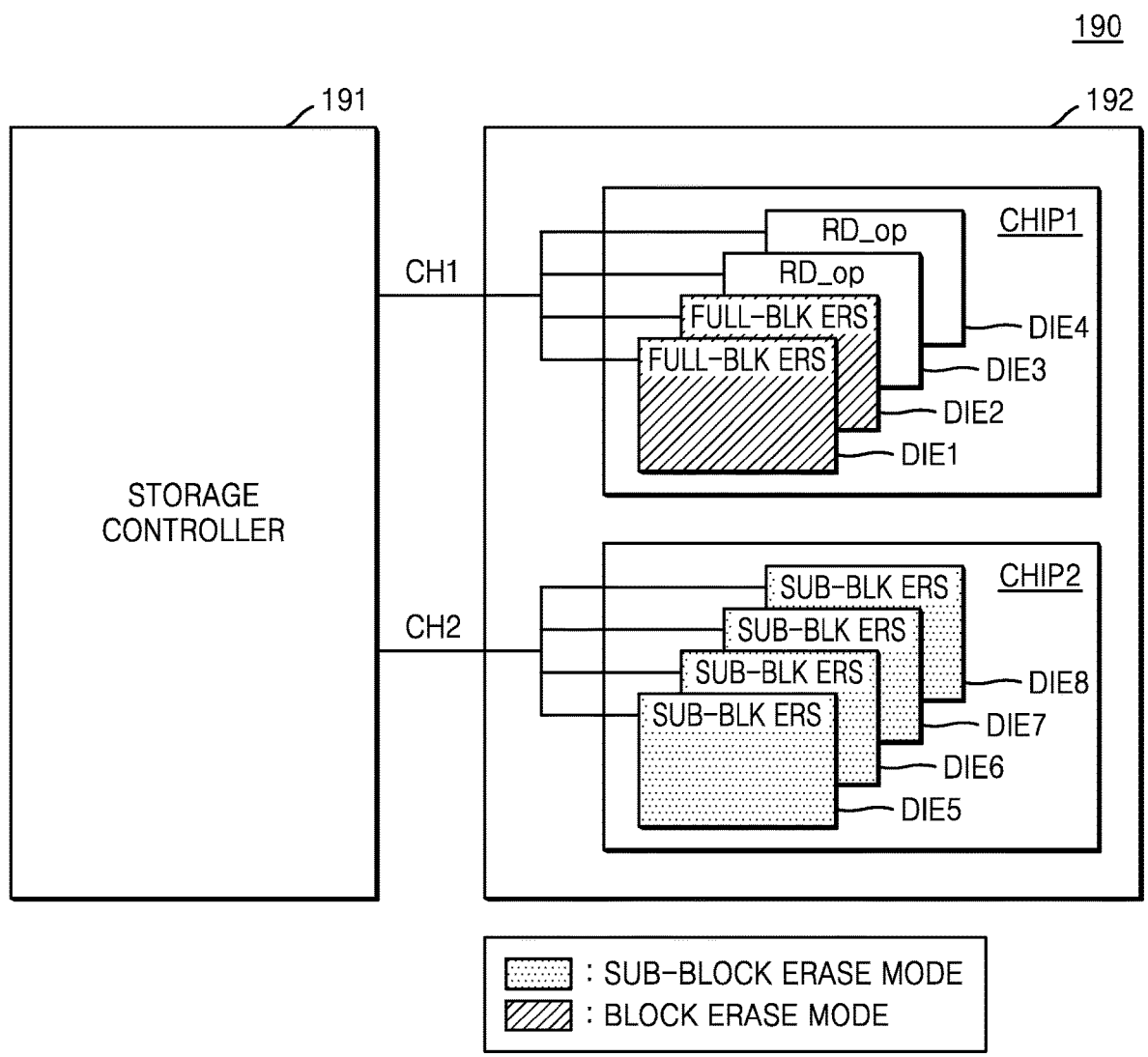

FIG. 19 illustrates a storage device 190 controlling an erase mode for each memory chip, according to example embodiments.

Referring to FIG. 19, the storage device 190 may include a storage controller 191 and an NVM 192. The storage device 190 may include or may be similar in many respects to a modified example of the storage device 180 of FIG. 18, and may include additional features not mentioned above. Consequently, a redundant description thereof may be omitted.

In an embodiment, when the read operation RD_op or a program operation is performed on the third and fourth memory dies DIE3 and DIE4 of the first memory chip CHIP1, the storage controller 191 may determine the full block erase mode FULL-BLK ERS and/or a block erase mode with respect to the first memory chip CHIP1, and may determine the sub-block erase mode SUB-BLK ERS with respect to the second memory chip CHIP2. Accordingly, the storage controller 191 may control an erase operation with respect to the first and second memory dies DIE1 and DIE2 of the first memory chip CHIP1 for each block. Alternatively or additionally, the storage controller 191 may control an erase operation with respect to the fifth to eighth memory dies DIE5 to DIE8 of the second memory chip CHIP2 for each sub-block.

Figure 20:
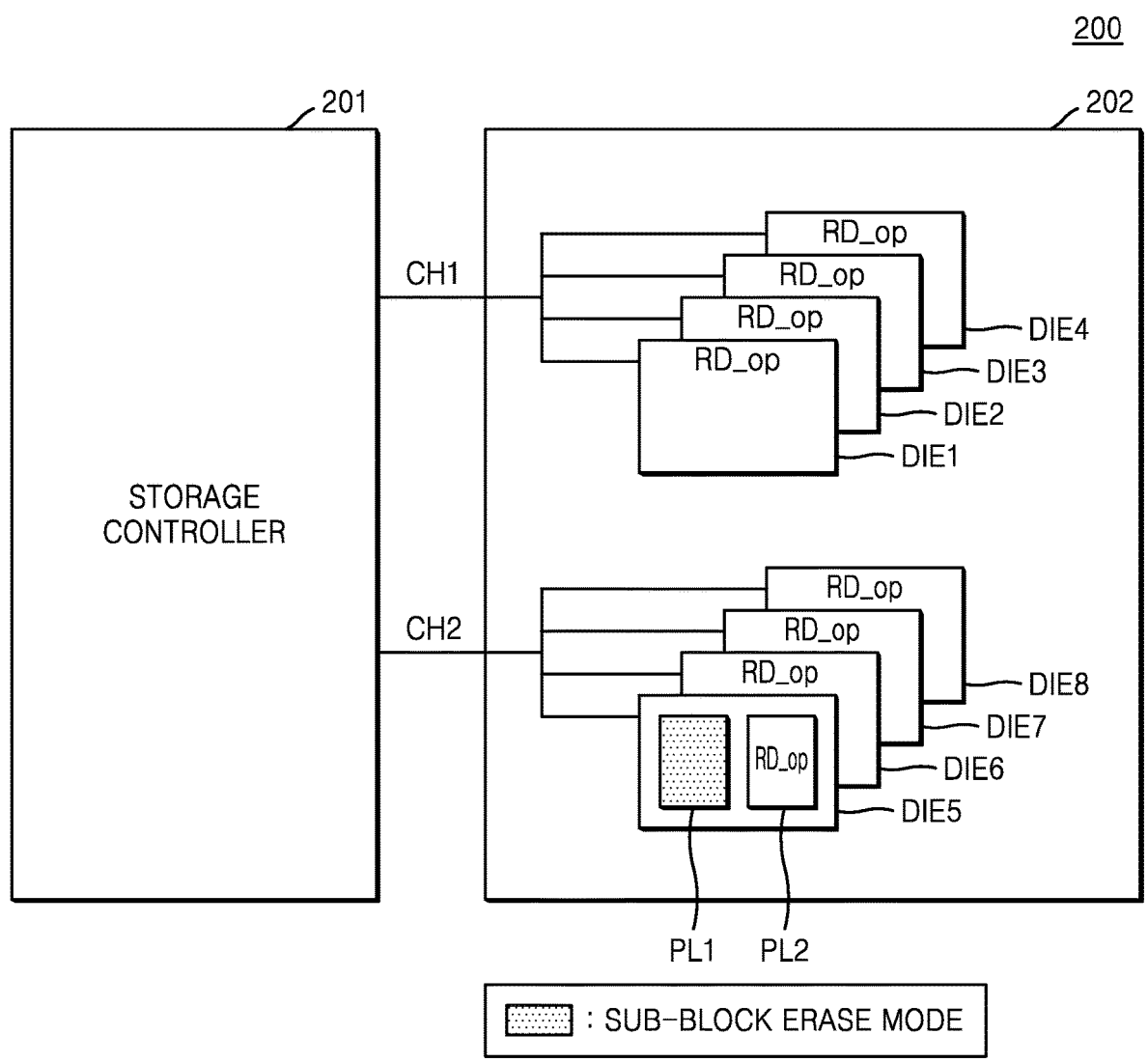
FIGS. 20 and 21 each illustrate a storage device controlling an erase mode for each memory plane, according to some embodiments.

FIG. 20 illustrates a storage device 200 controlling an erase mode for each memory plane, according to an embodiment.

Referring to FIG. 20, the storage device 200 may include a storage controller 201 and an NVM 202. The storage controller 201 may include or may be similar in many respects to an example of the storage controller 11a of FIG. 15, and the NVM 202 may include or may be similar in many respects to an example of the NVM 12b of FIG. 15, and may include additional features not mentioned above.

In an embodiment, the NVM 202 may include the first to eighth memory dies DIE1 to DIE8, and each of the first to eighth memory dies DIE1 to DIE8 may include a first memory plane PL1 and a second memory plane PL2. In such an embodiment, the first and second memory planes PL1 and PL2 may correspond to an example of the plurality of memory groups of FIG. 15. For example, the first to fourth memory dies DIE1 to DIE4 may communicate with the storage controller 201 through the first channel CH1, and the fifth to eighth memory dies DIE5 to DIE8 may communicate with the storage controller 201 through the second channel CH2.

When a read operation and/or a program operation is performed on one of the first and second memory planes PL1 and PL2 (e.g., when the read operation RD_op is performed on the second memory plane PL2), the storage controller 201 may determine that an intensive read operation is performed on the second memory plane PL2 of the fifth memory die DIE5. In such an example, the storage controller 201 may determine the erase mode of the first memory plane PL1 as the sub-block erase mode SUB-BLK ERS, and may control the erase operation with respect to the first memory plane PL1 for each sub-block.

Figure 21:
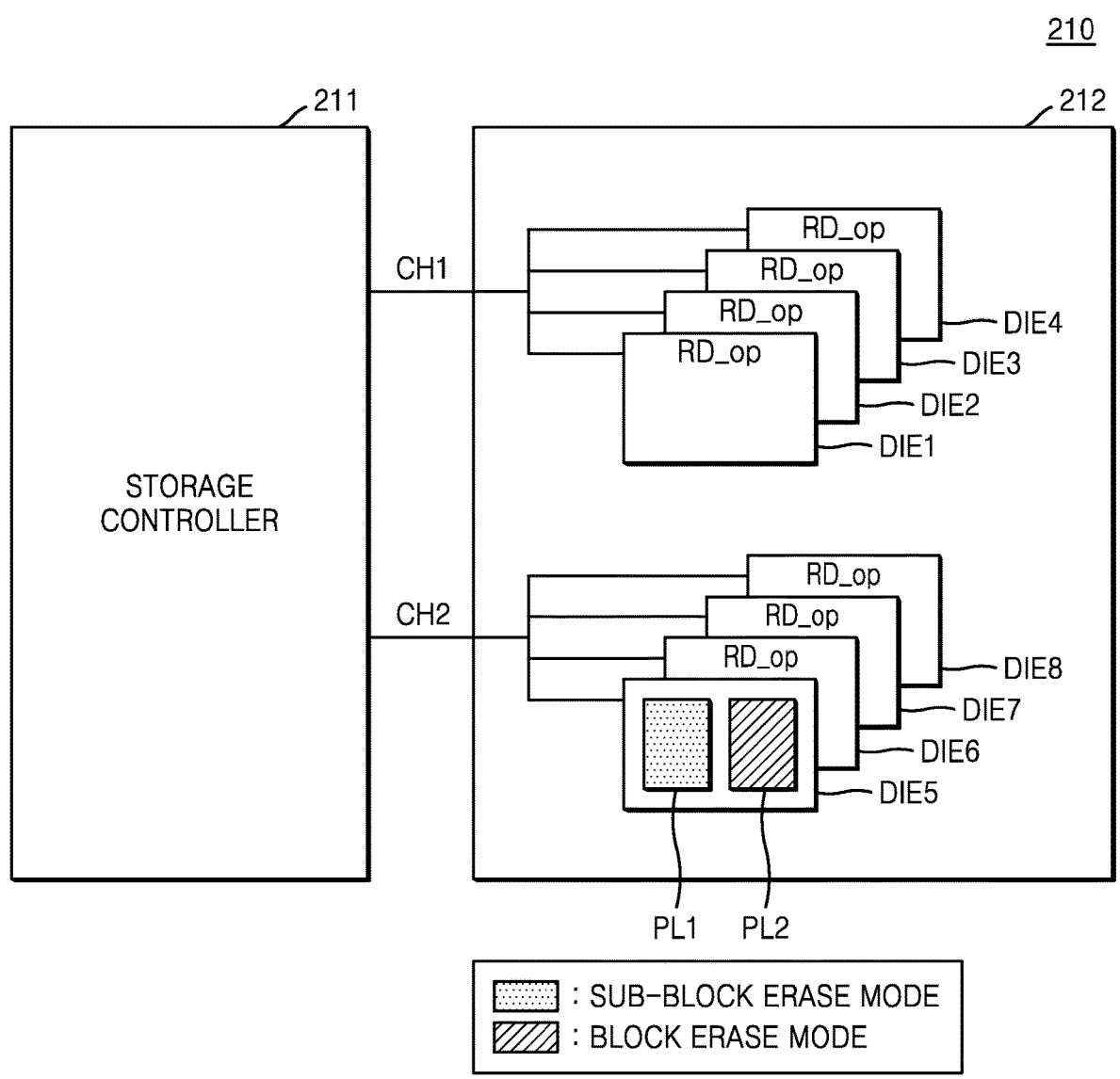

FIG. 21 illustrates a storage device 210 controlling an erase mode for each memory plane, according to an embodiment.

Referring to FIG. 21, a storage device 210 may include a storage controller 211 and an NVM 212. The storage device 210 may include or may be similar in many respects to a modified example of the storage device 200 of FIG. 20, and may include additional features not mentioned above. Consequently, a redundant description thereof may be omitted.

In an embodiment, when the read operation RD_op is performed on the first to fourth memory dies DIE1 to DI4 and the sixth to eighth memory dies DIE6 to DIE8, the storage controller 211 may respectively determine erase modes corresponding to the first and second memory planes PL1 and PL2 of the fifth memory dies DIE5. For example, the storage controller 211 may determine the sub-block erase mode SUB-BLK ERS with respect to the first memory plane PL1 of the fifth memory die DIE5, and the full block erase mode FULL-BLK ERS and/or a block erase mode with respect to the second memory plane PL2 of the fifth memory die DIE5. Accordingly, the storage controller 211 may control an erase operation with respect to the first memory plane PL1 of the fifth memory die DIE5 for each sub-block. Alternatively or additionally, the storage controller 211 may control an erase operation with respect to the second memory plane PL2 of the fifth memory die DIE5 for each block.

Figure 22:
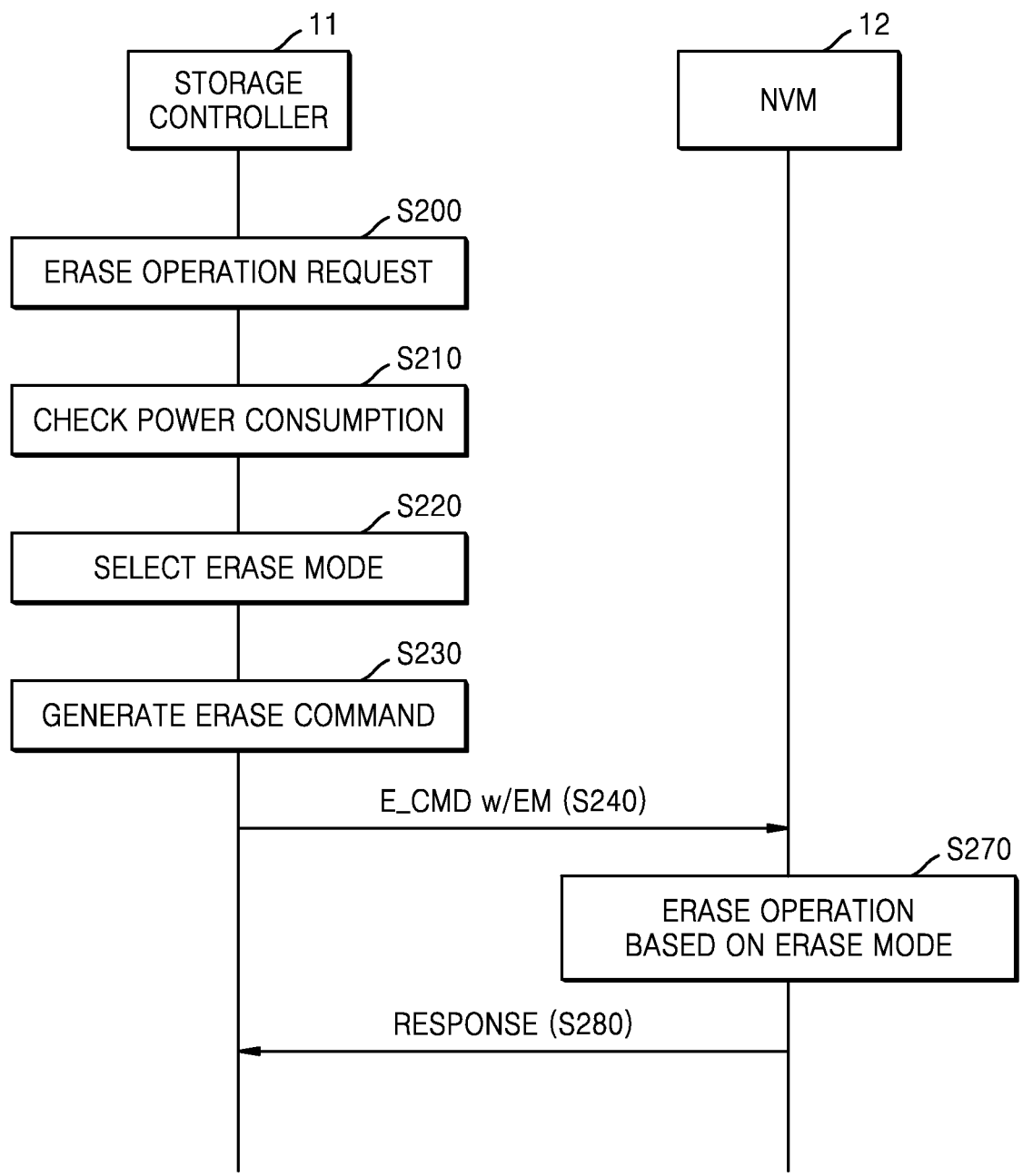
FIG. 22 is a flowchart illustrating a method of operating a storage device, according to an embodiment.

FIG. 22 is a flowchart illustrating a method of operating a storage device, according to an embodiment.

Referring to FIG. 22, the operating method, according to the present disclosure, may be performed by, for example, the storage controller 11 and the NVM 12 of FIG. 1. The detailed descriptions given above with reference to FIGS. 1 to 21 may also be applied to the present embodiment, and redundant descriptions may be omitted.

In operation S200, the storage controller 11 may generate an erase operation request. In operation S210, the storage controller 11 may check power consumption. In operation S220, the storage controller 11 may select an erase mode. In operation S230, the storage controller 11 may generate an erase command E_CMD. In operation S240, the storage controller 11 may transmit the erase command E_CMD including erase mode information EM to the NVM 12. In operation S270, the NVM 12 may perform an erase operation based on an erase mode in response to the erase command E_CMD. In operation S280, the NVM 12 may transmit a response indicating completion of the erase operation to the storage controller 11.

Figure 23:
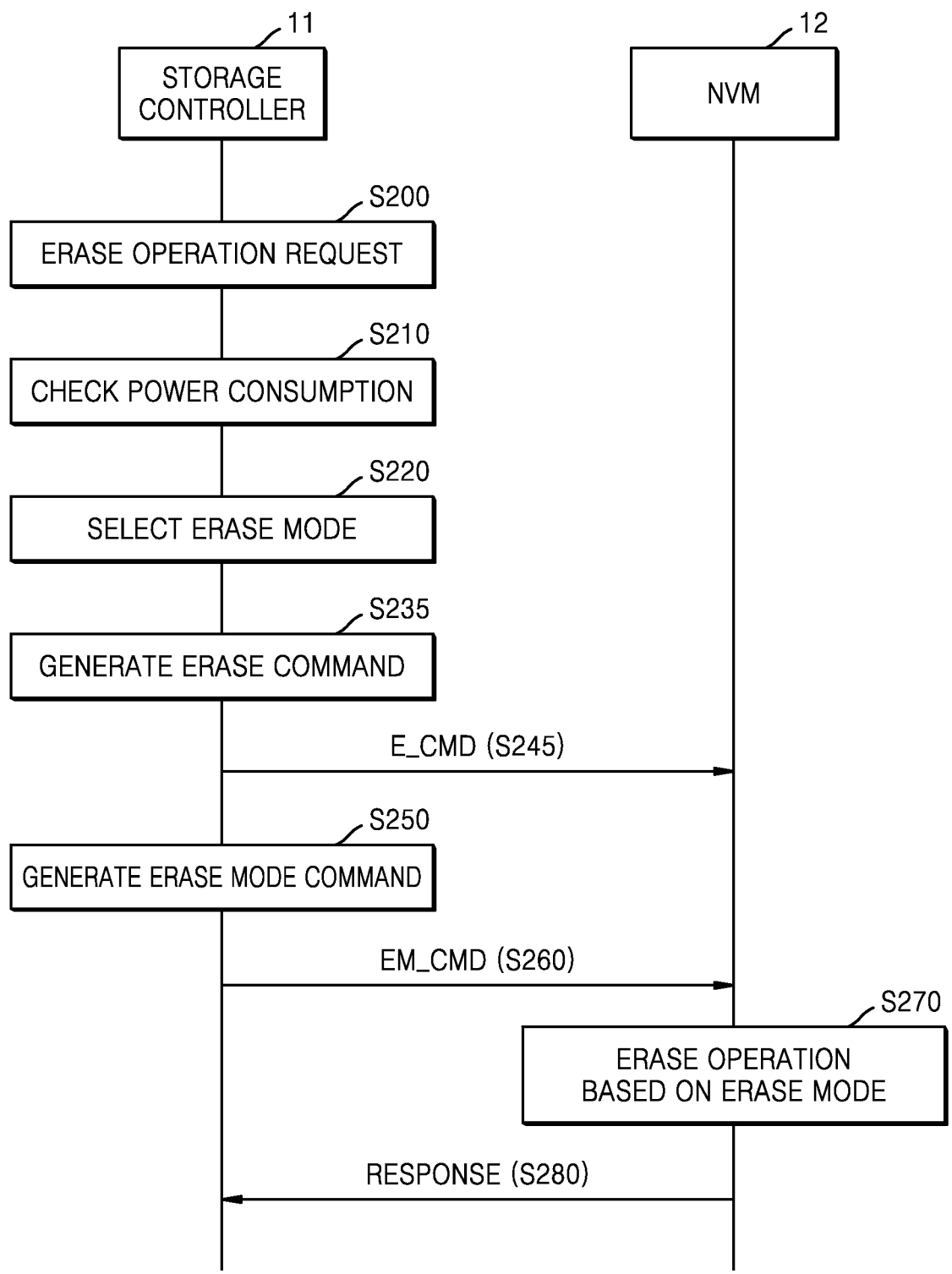
FIG. 23 is a flowchart illustrating a method of operating a storage device, according to an embodiment.

FIG. 23 is a flowchart illustrating a method of operating a storage device, according to an embodiment.

Referring to FIG. 23, the operating method, according to the present disclosure, may be performed by, for example, by the storage controller 11 and the NVM 12 of FIG. 1, and may include or may be similar in many respects to a modified example of the operating method of FIG. 22. Accordingly, the contents described above with reference to FIGS. 1 to 22 may also be applied to the present embodiment, and redundant descriptions may be omitted.

In operation S200, the storage controller 11 may generate an erase operation request. In operation S210, the storage controller 11 may check power consumption. In operation S220, the storage controller 11 may select an erase mode. In operation S235, the storage controller 11 may generate the erase command E_CMD. In operation S245, the storage controller 11 may transmit the erase command E_CMD to the NVM 12. In operation S250, the storage controller 11 may generate an erase mode command EM_CMD. In operation S260, the storage controller 11 may transmit the erase mode command EM_CMD to the NVM 12. In operation S270, the NVM 12 may perform an erase operation based on an erase mode in response to the erase command E_CMD. In operation S280, the NVM 12 may transmit a response indicating completion of the erase operation to the storage controller 11.

Figure 24:
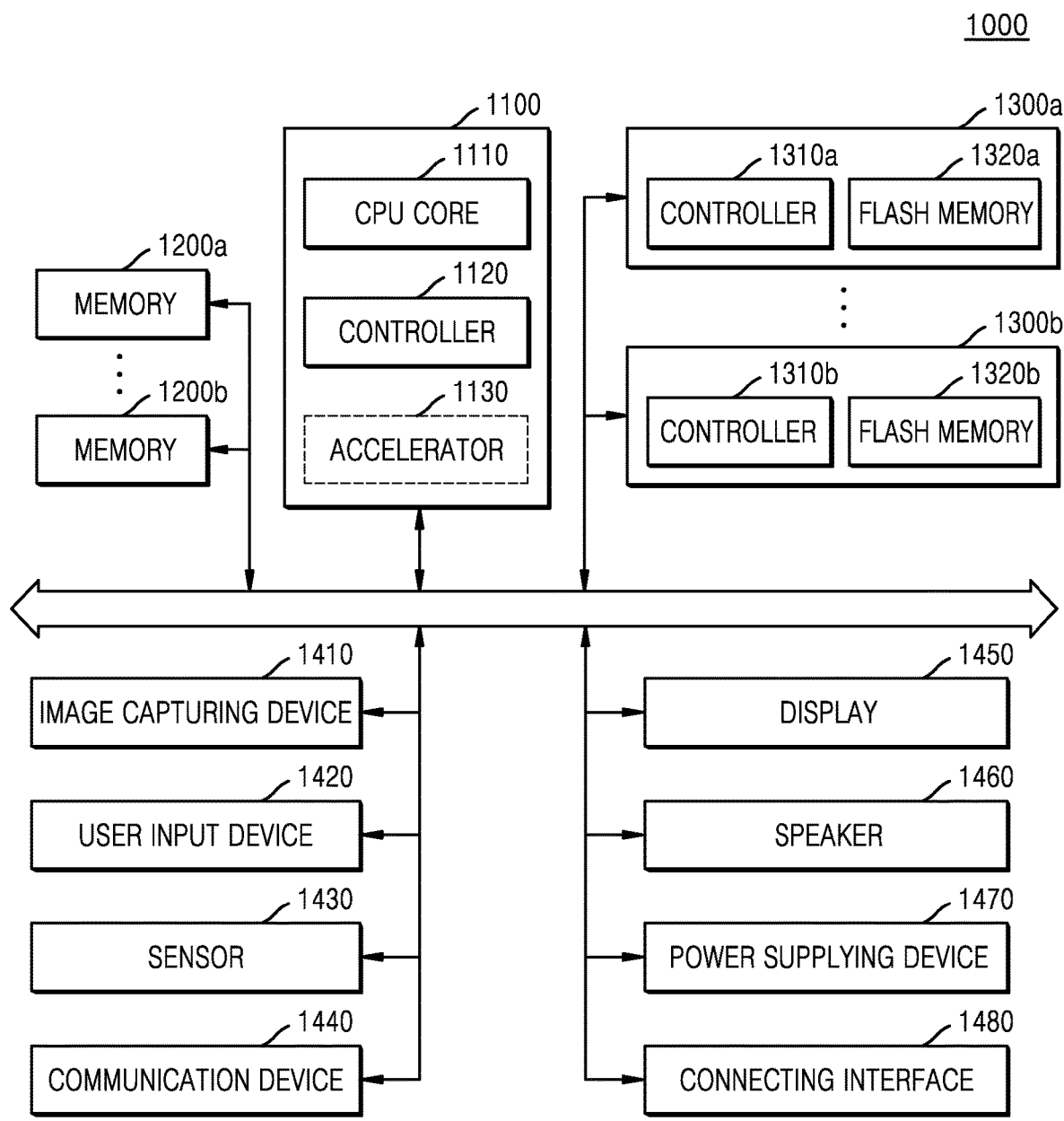
FIG. 24 is a diagram of a system to which a storage device is applied, according to an embodiment.

FIG. 24 is a diagram of a system 1000 to which a storage device may be applied, according to an embodiment. The system 1000 of FIG. 24 may be and/or may include, but not be limited to, a mobile system, such as a portable communication terminal (e.g., a mobile phone), a smartphone, a tablet, a personal computer (PC), a wearable device, a healthcare device, an Internet of things (IOT) device, or the like. However, the system 1000 of FIG. 24 may not be limited to the mobile system and may be and/or include another electronic device such as, but not be limited to, a PC, a laptop computer, a server, a media player, an automotive device (e.g., a navigation device), or the like.

Referring to FIG. 24, the system 1000 may include a main processor 1100, memories (e.g., 1200a and 1200b), and storage devices (e.g., 1300a and 1300b). Alternatively or additionally, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control the operations of the system 1000. Alternatively or additionally, the main processor 1100 may control operations of other components included in the system 1000. The main processor 1100 may be implemented as a general-purpose processor, a dedicated processor, and/or an application processor.

The main processor 1100 may include at least one CPU core 1110, and/or further include a controller 1120 configured to control the memories 1200a and 1200b and/or the storage devices 1300a and 1300b. In some embodiments, the main processor 1100 may further include an accelerator 1130, which may be and/or may include a dedicated circuit for a high-speed data operation, such as, but not limited to, an artificial intelligence (AI) data operation. For example, the accelerator 1130 may include a graphics processing unit (GPU), a neural processing unit (NPU) and/or a data processing unit (DPU) and/or be implemented as a chip that may be physically separate from the other components of the main processor 1100.

The memories 1200a and 1200b may be used as main memory devices of the system 1000. Each of the memories 1200a and 1200b may include a volatile memory, such as, but not be limited to, SRAM and/or DRAM, and/or non-volatile memory, such as, but not be limited to, a flash memory, PRAM, and/or resistive RAM (ReRAM). In some embodiments, the memories 1200a and 1200b may be implemented in the same package as the main processor 1100.

The storage devices 1300a and 1300b may serve as non-volatile storage devices configured to store data regardless of whether power has been supplied thereto, and may have a larger storage capacity than the memories 1200a and 1200b. The storage devices 1300a and 1300b may respectively include storage controllers 1310a and 1310b and flash memories 1320a and 1320b (e.g., NVMs) configured to store data via the control of the storage controllers 1310a and 1310b. Although the flash memories 1320a and 1320b may include flash memories having a 2D structure and/or a 3D V-NAND structure, the flash memories 1320*a* and 1320*b* may include other types of NVMs, such as, but not limited to, PRAM and/or ReRAM.

The storage devices 1300*a* and 1300*b* may be physically separated from the main processor 1100 and be included in the system 1000 and/or implemented in the same package as the main processor 1100. Alternatively or additionally, the storage devices 1300*a* and 1300*b* may have types of solid-state devices (SSDs) and/or memory cards and may be removably combined with other components of the system 1000 through an interface, such as a connecting interface 1480. The storage devices 1300*a* and 1300*b* may be devices to which a memory storage standard protocol, such as, but not limited to, a UFS protocol, an eMMC protocol, or an NVMe protocol, may be applied, without being limited thereto.

The image capturing device 1410 may capture still images and/or moving images. The image capturing device 1410 may include, but not limited to, a camera, a camcorder, and/or a webcam.

The user input device 1420 may receive various types of data input by a user of the system 1000 and may include, but not limited to, a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include, but not limited to, a temperature sensor, a pressure sensor, an illuminance sensor, a position sensor, an acceleration sensor, a biosensor, a gyroscope sensor, and/or the like.

The communication device 1440 may transmit and/or receive signals between other devices outside the system 1000 according to various communication protocols. The communication device 1440 may include, but not limited to, an antenna, a transceiver, a modem, and/or the like.

The display 1450 and the speaker 1460 may serve as output devices configured to output visual information and auditory information, respectively, to the user of the system 1000.

The power supplying device 1470 may convert power supplied from a battery (not shown) embedded in the system 1000 and/or an external power source, and supply the converted power to each of components of the system 1000.

The connecting interface 1480 may provide connections between the system 1000 and external devices, which may be connected to the system 1000 and may be capable of transmitting and/or receiving data to and/or from the system 1000. The connecting interface 1480 may be implemented by using various interface schemes, such as, but not limited to, advanced technology attachment (ATA), serial ATA (SATA), external SATA (e-SATA), small computer small interface (SCSI), serial attached SCSI (SAS), PCI, PCIe, NVMe, Institute of Electrical and Electronics Engineers (IEEE) 1394 (FireWire), a universal serial bus (USB) interface, a secure digital (SD) card interface, a multi-media card (MMC) interface, an eMMC interface, a UFS interface, an embedded UFS (eUFS) interface, a compact flash (CF) card interface, and the like.

While the present disclosure has been particularly shown and described with reference to embodiments thereof, it is to be understood that various changes in form and details may be made therein without departing from the spirit and scope of the following claims.

What is claimed is:

1. A storage device, comprising:
   a non-volatile memory comprising a plurality of blocks, each block of the plurality of blocks comprising a plurality of independently erasable sub-blocks; and
   a storage controller configured to, according to at least one of an operation schedule and a power consumption of the non-volatile memory, select an erase mode from among a plurality of erase modes comprising a first sub-block erase mode and a second sub-block erase mode, and control an erase operation of the non-volatile memory, according to the selected erase mode,
   wherein, based on the selected erase mode being the first sub-block erase mode, the storage controller is configured to control a first erase operation with respect to one selected sub-block from among the plurality of independently erasable sub-blocks of a selected block from among the plurality of blocks,
   wherein, based on the selected erase mode being the second sub-block erase mode, the storage controller is configured to control a second erase operation with respect to two or more selected sub-blocks from among the plurality of independently erasable sub-blocks of the selected block, and
   wherein the storage controller is further configured to:
   determine the erase mode as at least one of the first sub-block erase mode and the second sub-block erase mode based on a number of read and write commands in a command queue related to the operation schedule being greater than or equal to a reference number or based on the power consumption being greater than a first threshold value.

2. The storage device of claim 1, wherein the plurality of erase modes further comprises a block erase mode, and the storage controller is further configured to:
   select the block erase mode as the selected erase mode according to the non-volatile memory being in a normal power mode and the power consumption of the non-volatile memory being less than a threshold value,
   wherein, based on the selected erase mode being the block erase mode, the storage controller is configured to control a third erase operation with respect to the selected block.

3. The storage device of claim 1, wherein the storage controller is further configured to perform at least one of:
   controlling the erase operation of the non-volatile memory, according to the selected erase mode, prior to performing a program operation on the non-volatile memory; and
   securing a free block in the non-volatile memory by controlling the erase operation of the non-volatile memory, according to the selected erase mode.

4. The storage device of claim 1, wherein:
   the plurality of independently erasable sub-blocks is disposed above a substrate in a vertical direction,
   each sub-block of the plurality of independently erasable sub-blocks corresponds to a memory stack of a plurality of memory stacks, and
   each memory stack of the plurality of memory stacks extends in the vertical direction.

5. The storage device of claim 1, wherein the first sub-block erase mode and the second sub-block erase mode correspond to a low power mode.

6. The storage device of claim 1, wherein the plurality of erase modes further comprises a block erase mode, and the storage controller is further configured to:
   determine the erase mode as the block erase mode based on the number of the read and write commands being less than the reference number.

7. The storage device of claim 1, wherein the plurality of erase modes further comprises a block erase mode, and the storage controller is further configured to:
- select the block erase mode as the selected erase mode based on the power consumption being less than or equal to the first threshold value;
- select the second sub-block erase mode as the selected erase mode based on the power consumption being greater than the first threshold value and less than a second threshold value; and
- select the first sub-block erase mode as the selected erase mode based on the power consumption being greater than or equal to the second threshold value.

8. The storage device of claim 7, wherein the power consumption comprises at least one of a power consumption of the storage device, a power consumption of the non-volatile memory, a current power consumption of the non-volatile memory, and a future power consumption of the non-volatile memory.

9. The storage device of claim 1, wherein:
- the plurality of erase modes further comprises a third sub-block erase mode and a fourth sub-block erase mode,
- each sub-block of the plurality of independently erasable sub-blocks is grouped into a plurality of independently erasable groups,
- based on the selected erase mode being the third sub-block erase mode, the storage controller is configured to control a third erase operation with respect to at least one group from among the plurality of independently erasable groups comprising the one selected sub-block, and
- based on the selected erase mode being the fourth sub-block erase mode, the storage controller is configured to control a fourth erase operation with respect to two or more groups from among the plurality of independently erasable groups comprising the two or more selected sub-blocks.

10. The storage device of claim 1, wherein the storage controller is further configured to:
- control a garbage collection operation of the non-volatile memory, according to the selected erase mode;
- secure a free sub-block by performing at least one of the first erase operation and the second erase operation, and
- based on the erase operation being completed, control a program operation with respect to the one selected sub-block or the two or more selected sub-blocks.

11. The storage device of claim 1, wherein the storage controller is further configured to:
- transmit, to the non-volatile memory, an indication of the selected erase mode.

12. The storage device of claim 1, wherein the storage controller is further configured to:
- select the selected erase mode from among the plurality of erase modes according to at least one of a latency and an erase-program interval.

13. A storage device, comprising:
- a plurality of non-volatile memories, each non-volatile memory of the plurality of non-volatile memories comprising a plurality of blocks, each block of the plurality of blocks comprising a plurality of independently erasable sub-blocks; and
- a storage controller configured to select, for each non-volatile memory of the plurality of non-volatile memories, a corresponding erase mode, according to at least one of an operation schedule and power consumption of the plurality of non-volatile memories, and control, for each non-volatile memory of the plurality of non-volatile memories, an erase operation of that non-volatile memory according to the corresponding erase mode, wherein the storage controller is further configured to:
- select a sub-block erase mode as the corresponding erase mode of at least one non-volatile memory of the plurality of non-volatile memories based on the power consumption being greater than or equal to a threshold value, and
- control the erase operation with respect to at least one sub-block from among the plurality of independently erasable sub-blocks of the at least one non-volatile memory of the plurality of non-volatile memories based on the sub-block erase mode being the corresponding erase mode of the at least one non-volatile memory.

14. The storage device of claim 13, wherein the storage controller is further configured to:
- select a block erase mode as the corresponding erase mode when the power consumption is less than the threshold value,
- wherein, based on the corresponding erase mode being the block erase mode, control a second erase operation with respect to each block of the plurality of blocks of each non-volatile memory of the plurality of non-volatile memories.

15. The storage device of claim 13, wherein the plurality of non-volatile memories comprises at least one of a plurality of memory chips, a plurality of memory dies, and a plurality of memory planes.

16. The storage device of claim 13, wherein the storage controller is further configured to:
- control, according to a first sub-block erase mode, a first erase operation with respect to a sub-block of the plurality of independently erasable sub-blocks of a block of the plurality of blocks of each non-volatile memory of the plurality of non-volatile memories; and
- control, according to a second sub-block erase mode, a second erase operation with respect to two or more sub-blocks of the plurality of independently erasable sub-blocks of two or more blocks of the plurality of blocks of each non-volatile memory of the plurality of non-volatile memories.

17. The storage device of claim 15, wherein:
- each sub-block of the plurality of independently erasable sub-blocks is grouped into a plurality of independently erasable groups,
- the sub-block erase mode comprises at least one of a third sub-block erase mode and a fourth sub-block erase mode, and the storage controller is further configured to:
- control a third erase operation with respect to at least one group from among the plurality of independently erasable groups comprising the at least one sub-block, when the corresponding erase mode is the third sub-block erase mode; and
- control a fourth erase operation with respect to two or more groups from among the plurality of independently erasable groups comprising at least two or more sub-blocks, when the corresponding erase mode is the fourth sub-block erase mode.

18. A non-volatile memory device, comprising:
a memory cell array comprising a plurality of blocks, each block of the plurality of blocks comprising a plurality of memory stacks stacked above a substrate in a vertical direction; and
an erase mode selector configured to:
select an erase mode from among a plurality of erase modes based on a command received from a storage controller; and
control an erase operation with respect to the memory cell array according to the selected erase mode,
wherein the erase operation is performed on a selected block from among the plurality of blocks based on the selected erase mode being a block erase mode,
wherein the erase operation is performed on one of the plurality of memory stacks of the selected block based on the erase mode being a first sub-block erase mode,
wherein the erase operation is simultaneously performed on two or more memory stacks from among the plurality of memory stacks of the selected block based on the erase mode being a second sub-block erase mode,
wherein the block erase mode is selected based on a power consumption of the non-volatile memory being less than or equal to a first threshold value,
wherein the second sub-block erase mode is selected based on the power consumption being greater than the first threshold value and less than a second threshold value, and
wherein the first sub-block erase mode is selected based on the power consumption being greater than or equal to the second threshold value.

19. The non-volatile memory device of claim 18, wherein the command comprises at least one of:
an erase mode command indicating the selected erase mode from among the plurality of erase modes, and
an erase command instructing the erase operation of the non-volatile memory device and comprising information about the selected erase mode.

20. The non-volatile memory device of claim 18, wherein:
the memory cell array is divided into at least one of a plurality of memory planes, a plurality of memory dies, and a plurality of memory chips, and
the erase mode selector is further configured to select different erase modes with respect to each of the plurality of memory planes, the plurality of memory dies, and the plurality of memory chips.

* * * * *